United States Patent
Tadakuma

(10) Patent No.: US 10,718,658 B2
(45) Date of Patent: Jul. 21, 2020

(54) OPTICAL FIBER SENSOR, SEISMIC PROSPECTING METHOD, METHOD OF MEASURING DISTRIBUTION OF PETROLEUM/NATURAL GAS RESERVOIR LAYER, STRAIN DETECTION METHOD, AND METHOD OF SPECIFYING POSITION OF A FISSURE IN STRATUM

(71) Applicant: FURUKAWA ELECTRIC CO., LTD., Tokyo (JP)

(72) Inventor: Masateru Tadakuma, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 601 days.

(21) Appl. No.: 15/420,974

(22) Filed: Jan. 31, 2017

(65) Prior Publication Data
US 2017/0138785 A1    May 18, 2017

Related U.S. Application Data

(63) Continuation of application No. PCT/JP2015/072371, filed on Aug. 6, 2015.
(Continued)

(30) Foreign Application Priority Data

Mar. 11, 2015    (JP) .................................. 2015-048733

(51) Int. Cl.
*G01H 9/00* (2006.01)
*G01V 1/00* (2006.01)
(Continued)

(52) U.S. Cl.
CPC ............. *G01H 9/004* (2013.01); *E21B 47/00* (2013.01); *G01D 5/353* (2013.01);
(Continued)

(58) Field of Classification Search
CPC .......... G01H 9/004; G01V 1/226; G01V 1/00; G01D 5/35358; G01D 5/353; E21B 47/00
See application file for complete search history.

(56) References Cited

U.S. PATENT DOCUMENTS 6,274,863 B1    8/2001  Kersey
7,974,182 B2 *  7/2011  Healey ............... G01M 11/3172
                                              370/215
(Continued)

FOREIGN PATENT DOCUMENTS

JP          5-203410       8/1993
JP        2003-505700      2/2003
(Continued)

OTHER PUBLICATIONS

International Search Report dated Nov. 2, 2015 in PCT/JP2015/072371, filed on Aug. 6, 2015 (with English Translation).
(Continued)

*Primary Examiner* — Que Tan Le
*Assistant Examiner* — Jennifer D Bennett
(74) *Attorney, Agent, or Firm* — Oblon, McClelland, Maier & Neustadt, L.L.P.

(57) ABSTRACT

An optical fiber sensor includes: a transmitting unit configured to output two lights into an optical fiber, wavelengths of the two lights being different from each other at a specific time, and at least one of the wavelengths of the two lights varying with time; and a measuring unit configured to receive back-scattered light output from the optical fiber and detect a temporal variation of an optical phase at an arbitrary interval in a longitudinal direction of the optical fiber by measuring measure an interference state of the two lights.

21 Claims, 28 Drawing Sheets

Related U.S. Application Data

(60) Provisional application No. 62/034,558, filed on Aug. 7, 2014.

(51) Int. Cl.
 *G01D 5/353* (2006.01)
 *G01V 1/22* (2006.01)
 *E21B 47/00* (2012.01)

(52) U.S. Cl.
 CPC ........... *G01D 5/35358* (2013.01); *G01V 1/00* (2013.01); *G01V 1/226* (2013.01)

(56) References Cited

U.S. PATENT DOCUMENTS

| | | | |
|---|---|---|---|
| 2006/0018586 A1* | 1/2006 | Kishida | G01B 11/16 385/12 |
| 2012/0162639 A1* | 6/2012 | Farhadiroushan | G01F 1/661 356/73.1 |
| 2012/0176606 A1* | 7/2012 | Zadorozhny | G01D 5/35361 356/73.1 |
| 2012/0278043 A1* | 11/2012 | Lewis | G01D 1/00 702/189 |
| 2013/0222811 A1* | 8/2013 | Handerek | G01M 11/3127 356/477 |
| 2017/0167949 A1* | 6/2017 | Xia | E21B 47/00 |

FOREIGN PATENT DOCUMENTS

| | | |
|---|---|---|
| JP | 2010-216877 | 9/2010 |
| JP | 2011-38839 | 2/2011 |
| WO | WO 2004/040241 A1 | 5/2004 |

OTHER PUBLICATIONS

Written Opinion dated Nov. 2, 2015 in PCT/JP2015/072371, filed on Aug. 6, 2015.
Yugo Shindo et al. "Earthquake Observation at the Seafloor using Fiber Optic Accelerometers," Proceedings of 32nd Meeting on Lightwave Sensing Technology LST32-13, Dec. 2003, pp. 6.
Peter Healey, "Review of Long Wavelength Single-Mode Optical Fiber Reflectometry Techniques", Journal of Lightwave Technology, vol. LT-3, No. 4, Aug. 1985, pp. 11.

* cited by examiner

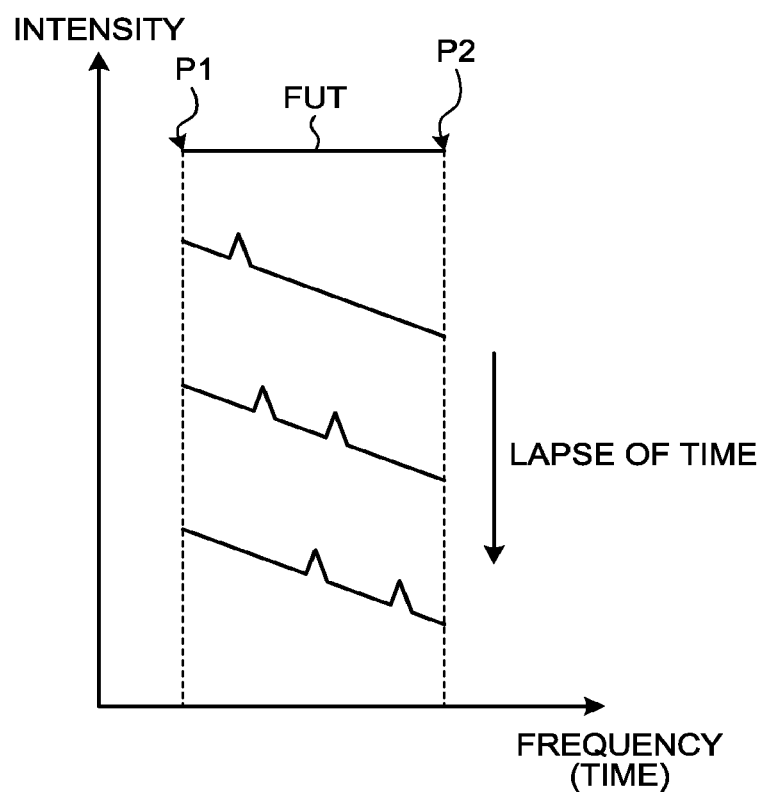

OPTICAL FIBER SENSOR, SEISMIC PROSPECTING METHOD, METHOD OF MEASURING DISTRIBUTION OF PETROLEUM/NATURAL GAS RESERVOIR LAYER, STRAIN DETECTION METHOD, AND METHOD OF SPECIFYING POSITION OF A FISSURE IN STRATUM

CROSS-REFERENCE TO RELATED APPLICATION(S)

This application is a continuation of International Application No. PCT/JP2015/072371, filed on Aug. 6, 2015, which claims the benefit of priority from U.S. Provisional Patent Application 62/034,558 filed on Aug. 7, 2014, and Japanese Patent Application No. 2015-048733 filed on Mar. 11, 2015, the entire contents of which are incorporated herein by reference.

BACKGROUND

The present disclosure relates to an optical fiber sensor and a seismic prospecting method using the same, a method of measuring distribution of a petroleum/natural gas reservoir layer, a strain detection method, and a method of specifying a position of a fissure in a stratum.

Seismic prospecting is frequently used when searching for petroleum gas. Sensing with an optical fiber has been performed for prospecting as a method of measuring an acoustic wave propagating in a deep underground and a seabed in recent years. A common acoustic wave optical fiber sensing uses an interference type sensor using a Michelson interferometer (Proceedings of 32nd Meeting on Lightwave Sensing Technology LST32-13, pp. 93-98) and an optical time domain reflectometry method (OTDR) specifying a position of a failure point by introducing an optical pulse into an optical transmission path and observing back-scattered light generated from the optical pulse.

The OTDR is widely used for managing and monitoring an optical fiber communication transmission path as a method of exploring a fracture point and a failure point formed in the optical transmission path (Journal of Lightwave Technology, VOL. LT-3, No. 4, pp. 876-886). In this measurement method, a distance resolution (the minimum distance of specifying a discrete phenomenon in the optical fiber) of a reflection point in the longitudinal direction of the optical fiber is defined by a distance by which an incident optical pulse travels for a duration of its pulse. Therefore, the distance resolution is ordinarily about 100 to 10 m and at least about 1 m. In the common acoustic wave optical fiber sensing by the OTDR, the distance resolution is at least about 1 m.

In addition, as a measurement method achieving the higher distance resolution than the OTDR, an optical frequency-domain reflectometry (OFDR) is used for a fiber optical communication technology. The OFDR sweeps a frequency of light emitted by an light source linearly in time, thereafter demultiplexes the light to signal light and reference light, introduces the signal light into an optical fiber subjected to measurement, multiplexes back-scattered light generated in the subject optical fiber with the reference light, and performs a heterodyne detection to the multiplexed light. A frequency difference between the back-scattered light and the reference light is in proportion of a difference in their optical path lengths. Therefore, a position where the back-scattered light is generated in the optical fiber may be specified by measuring a reflected-light intensity distribution in a frequency domain. In the OFDR, the distance resolution may be improved by narrowing a measured frequency band width at a receiving unit (Japanese Laid-open Patent Publication No. H5-203410).

Although the acoustic wave optical fiber sensor used as a conventional technology for petroleum gas prospecting uses the OTDR, a measurement method and a device with higher distance resolution are demanded to improve accuracy for petroleum gas.

SUMMARY

It is an object of the present invention to at least partially solve the problems in the conventional technology.

An optical fiber sensor according to one aspect of the present disclosure may include: a transmitting unit configured to output two lights into an optical fiber, wavelengths of the two lights being different from each other at a specific time, and at least one of the wavelengths of the two lights varying with time; and a measuring unit configured to receive back-scattered light output from the optical fiber and detect a temporal variation of an optical phase at an arbitrary interval in a longitudinal direction of the optical fiber by measuring measure an interference state of the two lights.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5C illustrates a time variation of a measured waveform;

DETAILED DESCRIPTION

Figure 1A:
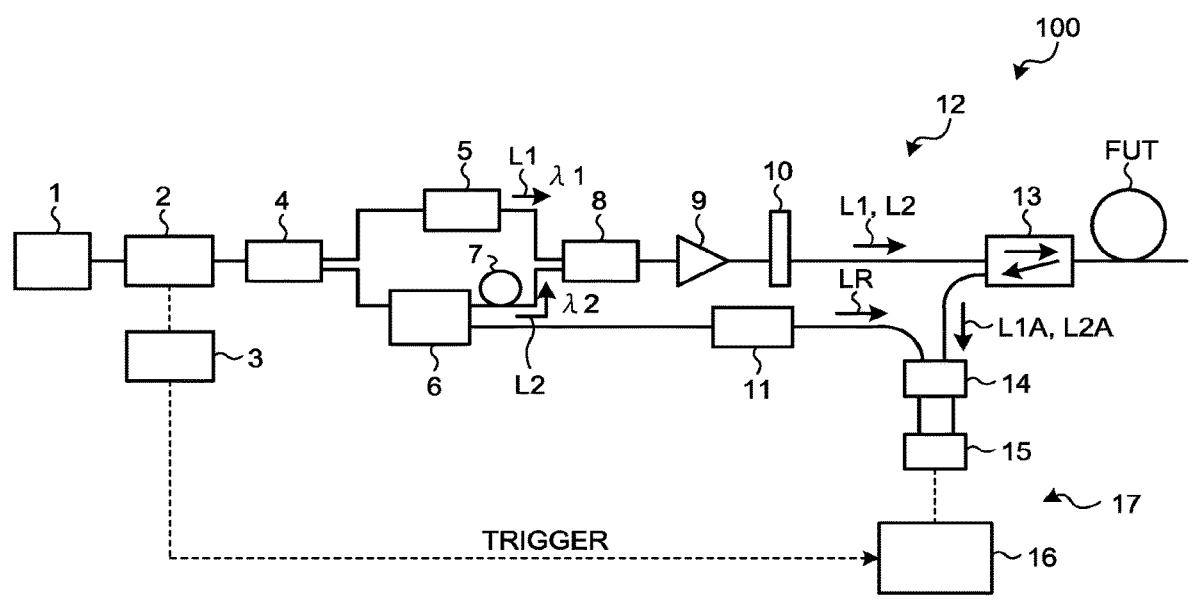
FIG. 1A is a schematic view of an optical fiber sensor according to a first embodiment.

An optical fiber sensor, a seismic prospecting method using the same, a method of measuring reservoir layer distribution of petroleum and natural gas, a strain detection method, and a method of specifying position of a fissure in a stratum according to the present disclosure will be explained with reference to the drawings in detail. The present disclosure is not limited to the embodiments explained below. In each drawing, identical or corresponding elements are given same reference numerals appropriately. Moreover, it should be noted that the drawings illustrate schematic examples. Accordingly, a relationship between respective elements may be different from real values. Among the drawings, there may be parts where the relationships and ratios of the illustrated sizes are different from one another.

To start with, a principle of detecting an acoustic wave at an optical fiber sensor will be explained. When an acoustic wave (frequency: from several tens Hz to 100 Hz) is propagated through an optical fiber subjected to measurement, its oscillation causes the optical fiber to extend and contract. Therefore, if it is possible to observe a time variation of a phase of back-scattered light from the measured optical fiber, it is possible to specify as to when, at which position, and at what frequency an acoustic wave exists. As a method of observing a phase variation, 1) there is a method of repeatedly measuring back-scattered light distribution over the entire length of a measured optical fiber and obtaining the phase variation from its temporal difference. On the other hand, 2) if a temporal variation of correlation (interference state) of back-scattered light from an interval of arbitrary two points of the measured optical fiber, it is possible to specify a state of generation of the acoustic wave between the two points.

An optical fiber sensor according to the embodiments of the present disclosure includes: a transmitting unit outputting, to an optical fiber subjected to measurement, two lights whose wavelengths differ at a specific time, both or one of the wavelengths varying with time; and a measuring unit receiving two back-scattered lights output from the measured optical fiber and measuring an interference state of the two lights. The measuring unit detects a temporal variation of an optical phase in an arbitrary interval in the longitudinal direction of the measured optical fiber by measuring the interference state of the back-scattered lights of the two lights.

The wavelengths of the two lights always differ at a specific time, and both or one of the wavelengths vary with time. Hereinafter, a wavelength of light may be represented by its frequency. Both or one of the frequencies of the two lights are modulated so as to vary linearly with time, and the modulation repeats at the same cycle. The cycle of the modulation is a cycle which is equal to or longer than a cycle which is determined by duration of reciprocations of the above-described two lights through a predetermined length of the measured optical fiber.

Herein by making the wavelengths of the two lights at a specific time always different from each other, it becomes possible to correlate the frequencies of light back-scattered at the specific time with positions where the light are back-scattered. The distance resolution may be set based on amounts of variation in wavelengths of the two lights. Herein, the amounts of variation in the wavelengths of the two lights may be adjusted and set precisely. Therefore, according to the embodiments of the present disclosure, the acoustic wave is detected with the improved distance resolution.

First Embodiment

FIG. 1A is a schematic view of an optical fiber sensor according to a first embodiment. As illustrated in FIG. 1A, an optical fiber sensor 100 includes a transmitting unit 12 and an optical circulator 13. The transmitting unit 12 includes a light source 1, a modulator 2, a signal-generator 3, a split coupler 4, a frequency shifter 5 that is an acousto-optical modulator (AOM), a split coupler 6, a delay optical fiber 7, a multiplexing coupler 8, an EDFA 9 that is an erbium-doped optical fiber amplifier, a band-pass filter 10, and a frequency shifter 11 that is an AOM. The light source 1, the modulator 2 and the signal-generator 3 form a light source unit. The light source unit may include the light source 1 and the signal-generator 3 as in FIG. 1B. Moreover, the optical fiber sensor 100 includes a measuring unit 17 including: a multiplexing coupler 14; a balanced photo-detector (balanced PD) 15 that is a light-receiving unit; and a frequency analysis unit 16. A trigger signal for adjusting timing is input from the signal-generator 3 to the frequency analysis unit 16.

Figure 1B:
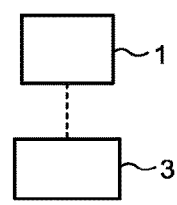
FIG. 1B is a view illustrating another configuration example of a light source unit.

The light source 1 outputs continuous light such as laser light or the like at a singular frequency. The modulator 2 performs frequency modulation to a wavelength (frequency) of the light output from the light source 1 temporally by a modulation signal delivered from the signal-generator 3. A cycle of the modulation is equalized to a cycle corresponding to a time length of reciprocation of the light in the optical fiber FUT to be measured. When configuring the light source unit as illustrated in FIG. 1B, modulation is performed directly by supplying a driving current, to which the modulation signal is overlapped, from the signal-generator 3 to the light source 1, and a wavelength (frequency) of the light output from the light source 1 is modulated temporally. The signal-generator 3 functions as a driving unit supplying the temporally-modulated driving current to the light source 1.

Figure 2:
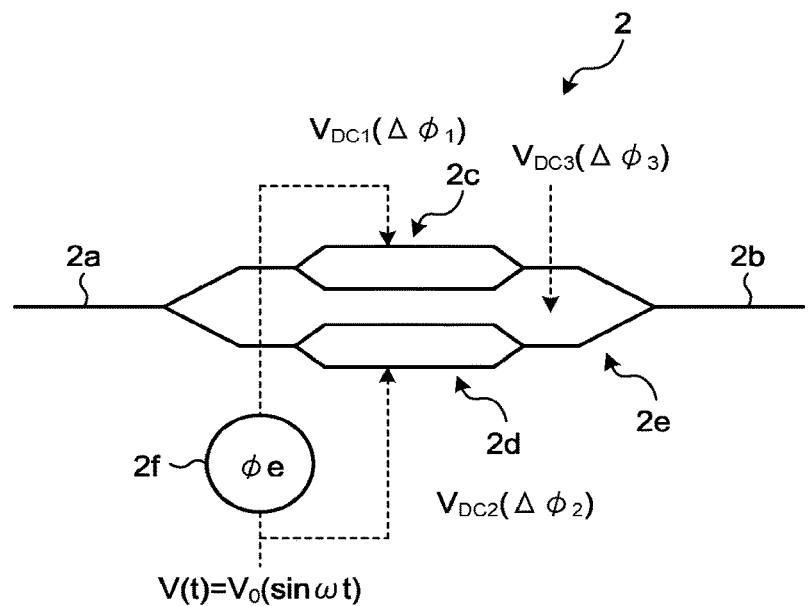
FIG. 2 is a schematic view of an example of a modulator illustrated in FIG. 1.
Figure 3:
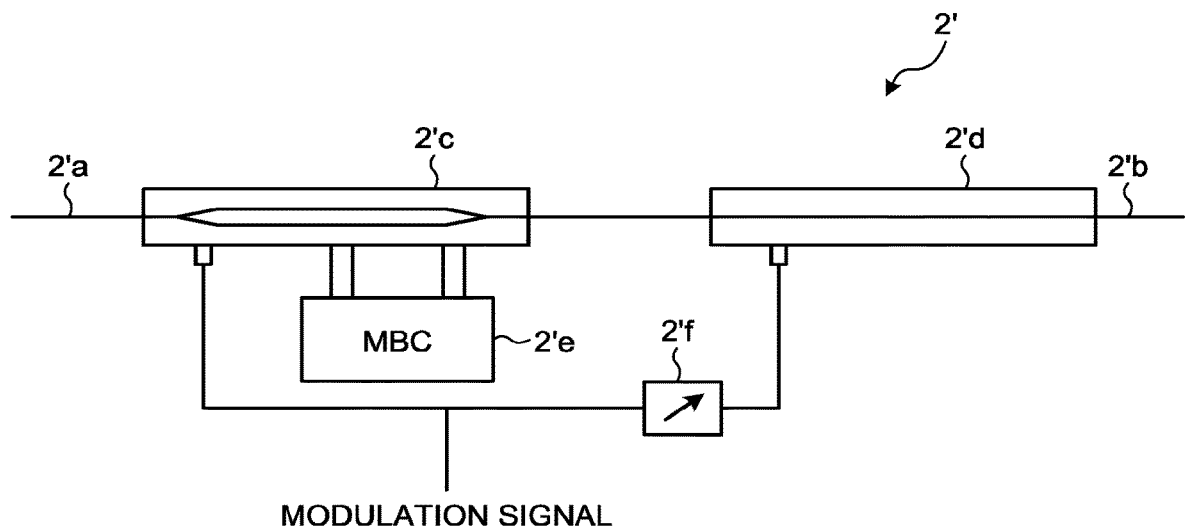
FIG. 3 is a schematic view of another example of the modulator illustrated in FIG. 1.

For example, the modulator 2 may use a single-sideband modulation method, by a modulator generally called as an IQ modulator illustrated in FIG. 2. The modulator 2 illustrated in FIG. 2 includes an optical input unit $2a$, an optical output unit $2b$, MZ interferometers $2c$, $2d$, and $2e$, and a phase delay unit $2f$. Bias voltages $V_{DC1}$ ($\Delta\varphi 1$) and $V_{DC2}$ ($\Delta\varphi 2$) which are obtained by applying delays to a voltage V(t) by the phase delay unit $2f$ are applied to the MZ interferometers $2c$ and $2d$, and a bias voltage $V_{DC3}$ ($\Delta\varphi 3$) ($\Delta\varphi 1$, $\Delta\varphi 2$, and $\Delta\varphi 3$ are phase differences) is applied to the MZ interferometer $2e$. Hereby the modulator 2 is capable of performing a single-sideband modulation. In place of the modulator 2 illustrated in FIG. 2, a configuration in which an interference type intensity modulator and a phase modulator are connected in series illustrated in FIG. 3 may be used. A modulator 2' includes an optical input unit $2'a$, an optical output unit $2'b$, an intensity modulator $2'c$, a phase modulator $2'd$, a phase delay unit $2'f$, and a bias controller $2'e$.

Referring back to FIG. 1A, the split coupler 4 splits the light output from the modulator 2 into two. The frequency shifter 5 shifts a frequency of one of the lights output from the split coupler 4 by a constant amount and outputs as light L1. A wavelength at a point in time, at which a wavelength has not been modulated, of the light L1 is indicated by λ1.

The split coupler 6 splits the other one of lights output from the split coupler 4 into two. The delay optical fiber 7 propagates one of the lights output from the split coupler 6. The light propagated through the delay optical fiber 7 is indicated by light L2. A wavelength at a point in time, at which a wavelength has not been modulated, of the light L2 is indicated by λ2. The multiplexing coupler 8 multiplexes the light L1 output from the frequency shifter 5 with the light L2 output from the delay optical fiber 7, and outputs as the two lights L1 and L2.

The EDFA 9 amplifies the lights L1 and L2 optically. The band-pass filter 10, while transmitting the lights L1 and L2 therethrough, removes an amplified spontaneous emission light (ASE) generated in the EDFA 9. The transmitting unit 12 outputs the lights L1 and L2 to the optical fiber FUT to be measured via the optical circulator 13. The EDFA 9 and the band-pass filter 10 used in accordance with an output light intensity of the light source 1 and the length of the optical fiber FUT to be measured, and the like appropriately, may be omitted.

On the other hand, the frequency shifter 11 shifts the frequency of the other one of the lights output from the split coupler 6 by a constant amount to generate reference light LR. Although split ratios for the split couplers 4 and 6 are not limited specifically, it is preferable that each split ratio be set so that optical intensities of the lights L1 and L2 be equal.

When the lights L1 and L2 are input to the optical fiber FUT to be measured, back-scattered lights L1A and L2A are generated by Rayleigh scattering from the lights L1 and L2. The back-scattered lights L1A and L2A are propagated through the optical fiber FUT to be measured in an opposite direction to the lights L1 and L2 and output by the optical circulator 13 to the measuring unit 17.

In the measuring unit 17, the multiplexing coupler 14 multiplexes the reference light LR with the back-scattered lights L1A and L2A. The balanced PD 15 receives the multiplexed lights, generates an electric signal including a beat signal by interference light generated by the reference light LR and the back-scattered lights L1A and L2A, and outputs to the frequency analysis unit 16. The frequency analysis unit 16 performs a frequency analysis to a desirable frequency domain of the electric signal. The frequency analysis unit 16 is, for example, a spectrum analyzer.

Herein a time rate of change of a wavelength modulated at the light source unit is indicated by γ (unit: Hz/s), a modulation cycle is indicated by f(Hz), and a length of the optical fiber FUT to be measured is indicated by L(m). Herein, f is set to satisfy f≤c/nL (c: speed of light, n: effective refractive index of the optical fiber FUT to be measured). The lights L1 and L2 are input to the measured optical fiber FUT at a same crock time, at wavelengths which are different by a certain constant amount of frequency shift (which is Δf, a positive direction indicates a direction in which frequency increases) applied by the frequency shifter 5, and a frequency shift difference γ×nΔl/c caused by an optical path length difference (which is Δl including a length of the delay optical fiber 7) of the two light paths between the split coupler 4 and the multiplexing coupler 8. Therefore, a wavelength difference (frequency difference) of two different lights (back-scattered lights L1A and L2A) back-scattered at a specific time from each point, in the longitudinal direction, of the optical fiber FUT to be measured is Δf+γnΔl/c.

Figure 4:
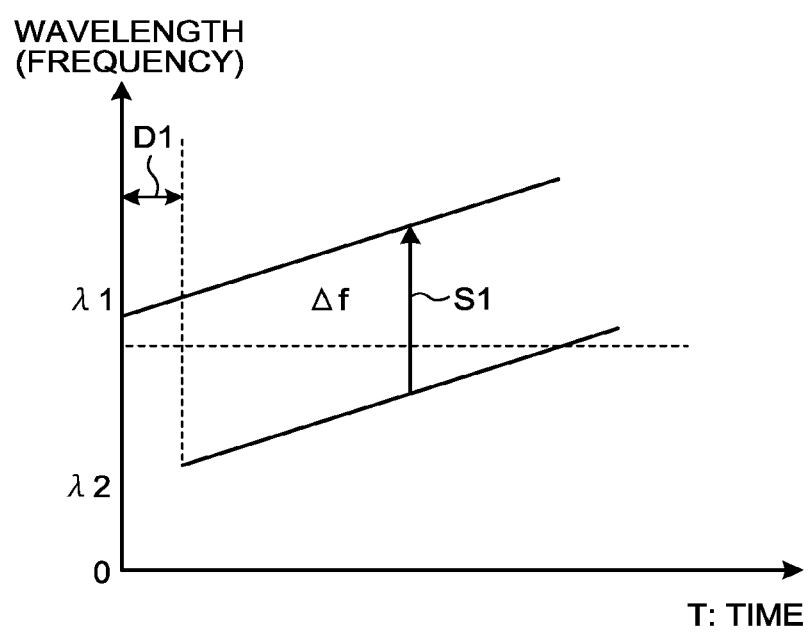
FIG. 4 illustrates a relationship of a temporal variation of a wavelength of back-scattered light in the optical fiber sensor according to the first embodiment.

FIG. 4 is a view illustrating a relationship of temporal variations of wavelengths of the back-scattered lights in the optical fiber sensor according to the first embodiment. As illustrated in FIG. 4, a line indicating the back-scattered light L1A (upper line) and a line indicating the back-scattered light L2A (lower line) vary linearly and temporally in wavelength (frequency). A shift S1 is a frequency shift subjected by the frequency shifter 5 and its shift amount herein is Δf. A delay D1 is a delay time due to an optical path length difference between two light paths between the split coupler 4 and the multiplexing coupler 8.

Figure 5A:
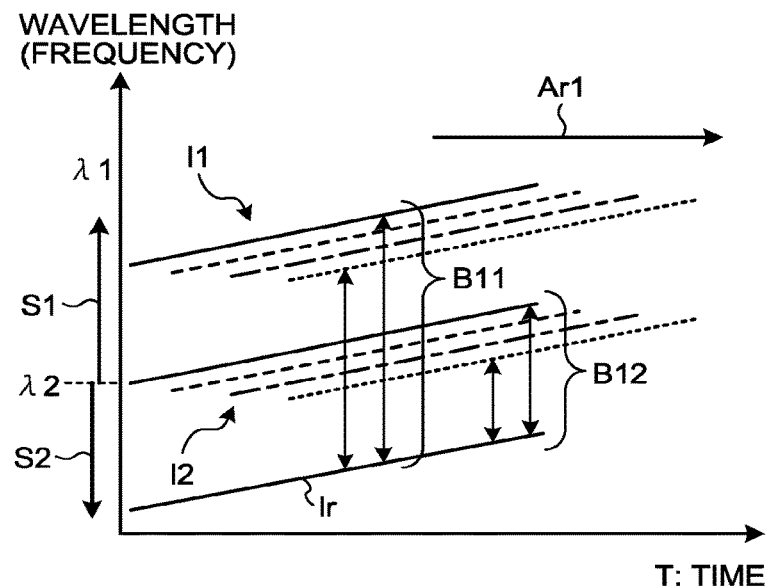
FIG. 5A illustrates a temporal wavelength (frequency) variation of light received by a balanced PD.

FIG. 5A illustrates temporal wavelength (frequency) variations of lights received by the balanced PD. A direction of the frequency shift (shift S2) for the light by the frequency shifter 11 is opposite to a direction of the frequency shift (shift S1) for the light by the frequency shifter 5. A line lr indicates variation in wavelength of the reference light LR. The lines l1 and l2 indicate wavelength variations of the back-scattered lights L1A and L2A respectively. Scattered lights, indicated by different dots, of the optical fiber FUT to be measured indicate different kinds of lines where it is indicated that the light going more in the direction of an arrow Ar1 is scattered at a point which is farther from an input side of the optical fiber FUT to be measured. Therefore, a solid line indicates the light scattered at a point close to the input side and a dotted line indicates the light scattered at a point far from the input side. A frequency domain of the interference light of the back-scattered light L2A by the reference light LR and the light L2 is indicated by B12, and a frequency domain of the interference light of the back-scattered light L1A by the reference light LR and the light L1 is indicated by B11. After that, by measuring, by using a frequency analysis device, a signal of a frequency corresponding to the frequency sweep areas B11 and B12 of the two lights from electric signals converted by the balanced PD 15, an intensity distribution waveform (OFDR waveform) relative to the frequency of the interference light is obtained.

Figure 5B:
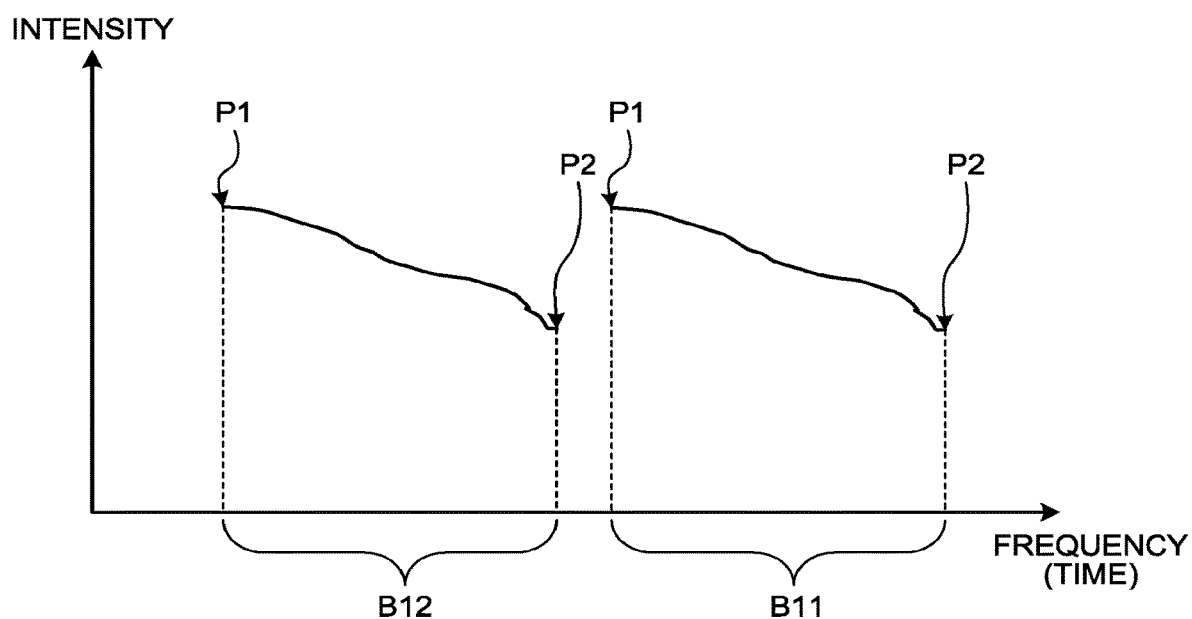
FIG. 5B illustrates a frequency of an interference intensity obtained at a specific time.

FIG. 5B illustrates frequency property of interference intensities at the B11 and B12 obtained at a specific time. Frequencies in the horizontal axis are proportional to a distance, in the longitudinal direction, of the optical fiber FUT to be measured and frequency variation times of the back-scattered lights L1A and L2A. A point P1 indicates an end (near end) of optical input ends of the optical fiber FUT to be measured, and a point P2 indicates a far end of the optical fiber FUT to be measured. By comparing these two waveforms, a phase variation at each point, in the longitudinal direction, of the optical fiber FUT to be measured at a specific time may be obtained. By performing this measurement temporally continuously, a temporal variation of an acoustic wave propagating through the optical fiber FUT to be measured may be observed.

FIG. 5C is a view illustrating a time variation of a waveform to be measured. As described above, a frequency in the horizontal axis is proportional to a distance, in the longitudinal direction, of the optical fiber FUT to be measured, the point P1 corresponds to the near end of the optical fiber FUT to be measured, and the point P2 corresponds to the far end of the optical fiber FUT to be measured. In FIG. 5C, a peak appearing in the waveform varies as time proceeds. This peak is caused by a phase variation by an acoustic wave of the back-scattered light L1A or L2A. Therefore, this peak means that the acoustic wave is generated at a position, of the optical fiber FUT to be measured, which corresponds to a frequency of this peak in that time.

According to the first embodiment of the present disclosure, by measuring, via the reference light LR, an interference state of the back-scattered lights L1A and L2A, temporal variations of optical phase at arbitrary intervals, in the longitudinal direction, of the optical fiber FUT to be measured are detected at two points simultaneously. By inputting the two lights L1 and L2 to the optical fiber FUT to be measured in this state, a distance resolution may be set with variation amounts of the wavelengths of the two lights L1 and L1. Therefore, according to the first embodiment of the present disclosure, an acoustic wave may be detected with a high distance resolution.

Second Embodiment

Figure 6:
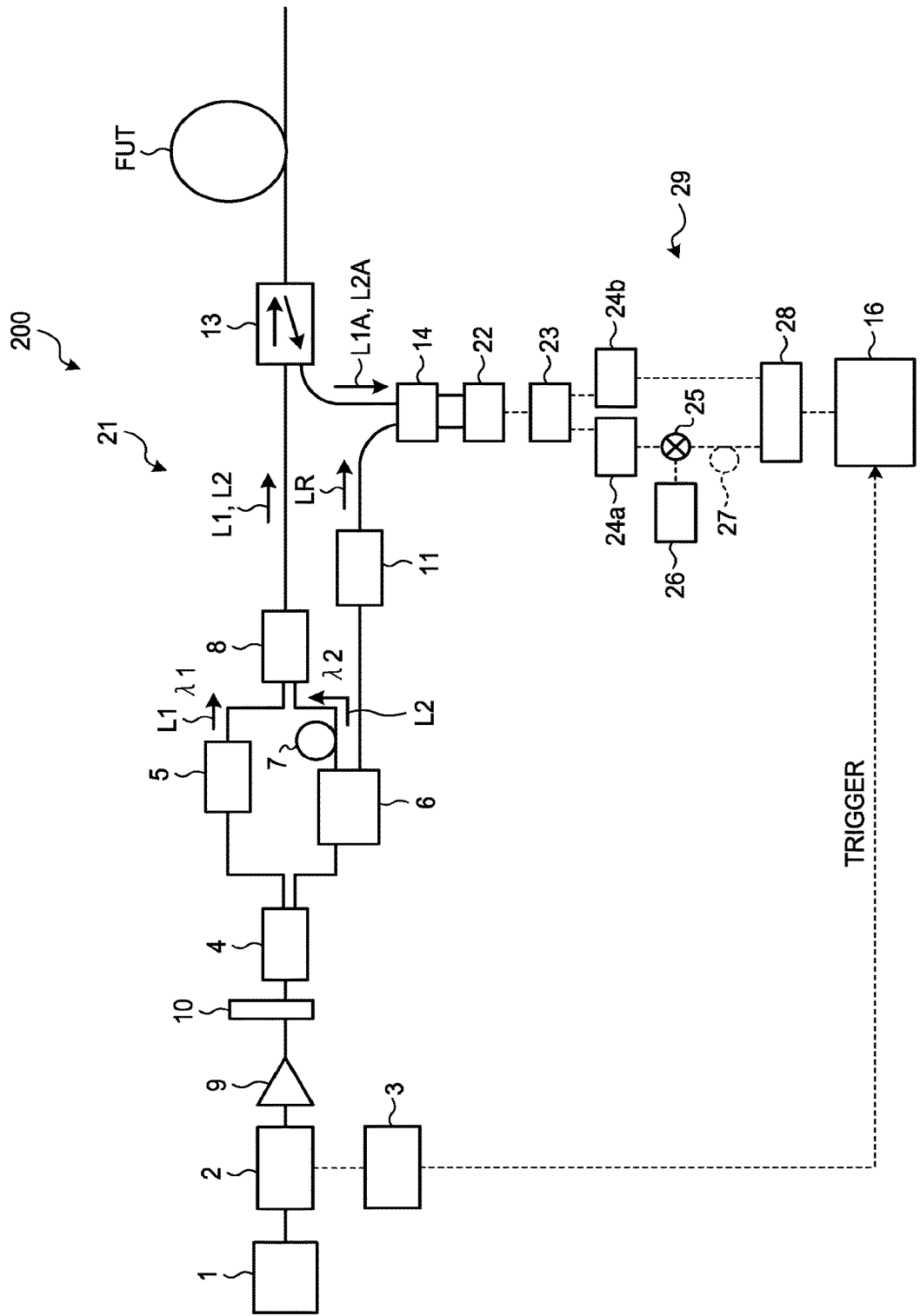
FIG. 6 is a schematic view of an optical fiber sensor according to a second embodiment.

FIG. 6 is a schematic view of an optical fiber sensor according to a second embodiment. As illustrated in FIG. 6, an optical fiber sensor 200 includes a transmitting unit 21 and the optical circulator 13. The transmitting unit 21 is one in which, in the transmitting unit 12 of the optical fiber sensor 100 illustrated in FIG. 1A, the EDFA 9 and the band-pass filter 10 are moved to between the modulator 2 and the split coupler 4. The optical fiber sensor 200 further includes a measuring unit 29 including the multiplexing coupler 14, a balanced PD 22, a splitter 23, band-pass filters 24a and 24b, a mixer 25, a signal-generator 26, a delay track 27, a coupler 28, and the frequency analysis unit 16.

Explanation of a function of the transmitting unit 21 that is similar to the function of the transmitting unit 12 is omitted. The measuring unit 29 will be explained. The multiplexing coupler 14 multiplexes the reference light LR with the back-scattered lights L1A and L2A. The balanced PD 22 receives the multiplexed lights and generates an electric signal including a beat signal due to the interference light generated by the reference light LR and the back-scattered lights L1A and L2A. The splitter 23 splits the electric signal into two. Transmission frequency bands of the two band-pass filters 24a and 24b differ from each other, and the two band-pass filters 24a and 24b transmit the two electric signals output from the splitter 23 therethrough respectively. The mixer 25 multiplexes the electric signal transmitted through the band-pass filter 24a with a sine wave signal output from the signal-generator 26 at a predetermined frequency. The mixer 25 is a mixer for frequency components and has a property of outputting a difference component of frequencies when two different frequency components are input thereinto. Therefore, an output from the mixer 25 becomes an electric signal of a frequency component of a difference between the electric signal transmitted through the band-pass filter 24a and the sine wave signal output from the signal-generator 26. The delay track 27 propagates the electric signal output from the mixer 25. The coupler 28 couples the electric signal propagated through the delay track 27 with the electric signal transmitted through the band-pass filter 24b and outputs to the frequency analysis unit 16.

Herein a frequency of the sine wave signal is set to coincide with a frequency shift amount by the frequency shifter 5. In addition, a delay time of the electric signal by the delay track 27 is set to coincide with a delay time by an optical path length difference between two light paths between the split coupler 4 and the multiplexing coupler 8 in the transmitting unit 21. Transmission frequency bands of the band-pass filters 24a and 24b correspond to frequency areas B21 and B22 that will be explained later.

Figure 7A:
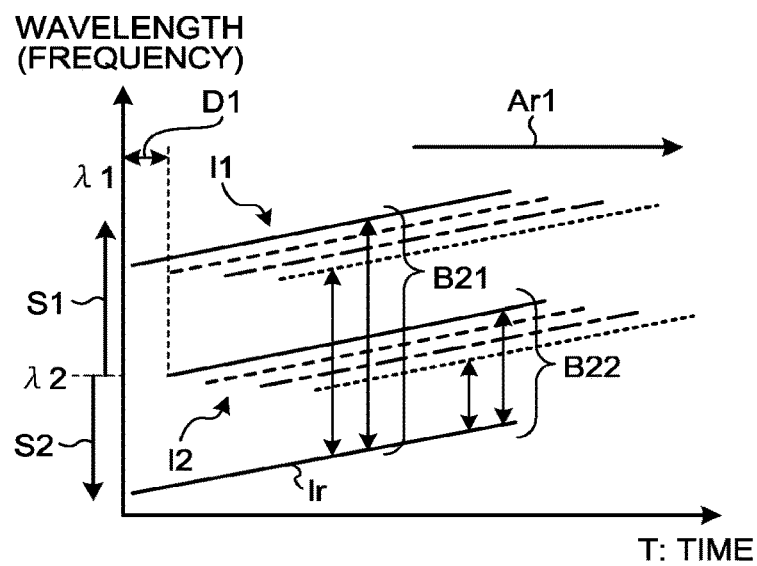
FIG. 7A illustrates a temporal wavelength (frequency) variation of light received by a balanced PD.

FIG. 7A illustrates temporal wavelength (frequency) variations of lights received by the balanced PD. A direction of the frequency shift (shift S2) for the light by the frequency shifter 11 is opposite to a direction of the frequency shift (shift S1) for the light by the frequency shifter 5. The line lr indicates wavelength variation of the reference light LR. The lines 11 and 12 indicate wavelength variations of the back-scattered lights L1A and L2A respectively. Scattered lights, indicated by different dots, of the optical fiber FUT to be measured indicate different kinds of lines where it is indicated that the light going more in the direction of an arrow Ar1 is scattered at a point which is farther from an input side of the optical fiber FUT to be measured. The delay D1 is a delay amount due to the optical path length difference of the two light paths between the split coupler 4 and the multiplexing coupler 8. A frequency area of the interference light of the back-scattered light L2A by the reference light LR and the light L2 is indicated by B22, and a frequency area of the interference light of the back-scattered light L1A by the reference light LR and the lights L1 is indicated by B21.

Figure 7B:
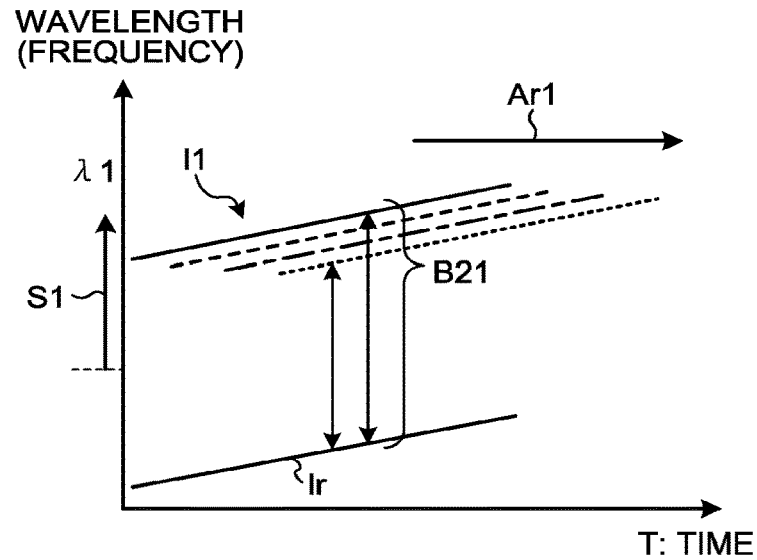
FIG. 7B illustrates a detail of an electric signal propagating through a band-pass filter.
Figure 7C:
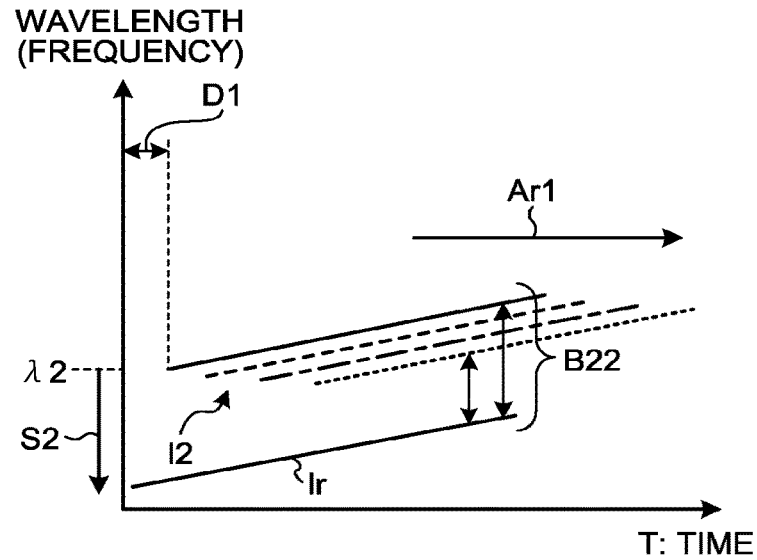
FIG. 7C illustrates a detail of an electric signal propagating through a band-pass filter.

FIG. 7B indicates a detail of an electric signal at a side of propagating through the band-pass filter 24a in FIG. 7A. FIG. 7C indicates a detail of an electric signal at a side of propagating through the band-pass filter 24b in FIG. 7A. An electric signal caused by the back-scattered light L1A passes through the band-pass filter 24a, and an electric signal caused by the back-scattered light L2A passes through the band-pass filter 24b.

Figure 7D:
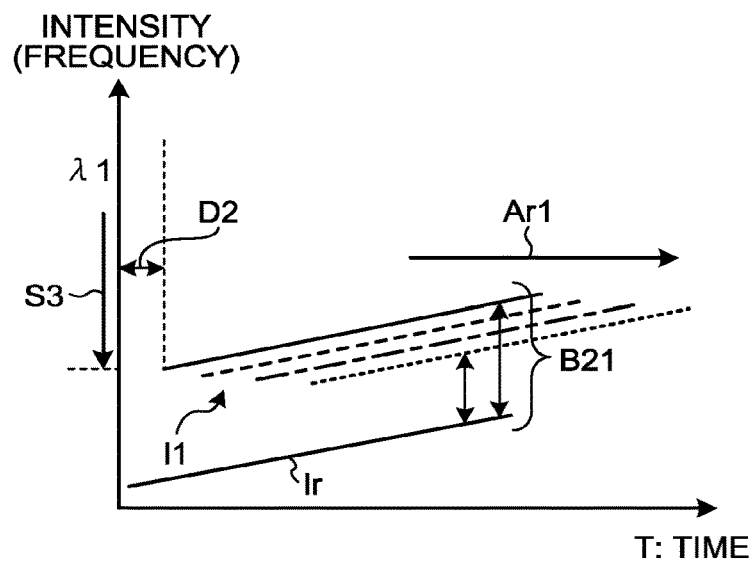
FIG. 7D illustrates operations of a mixer and a delay track.
Figure 7E:
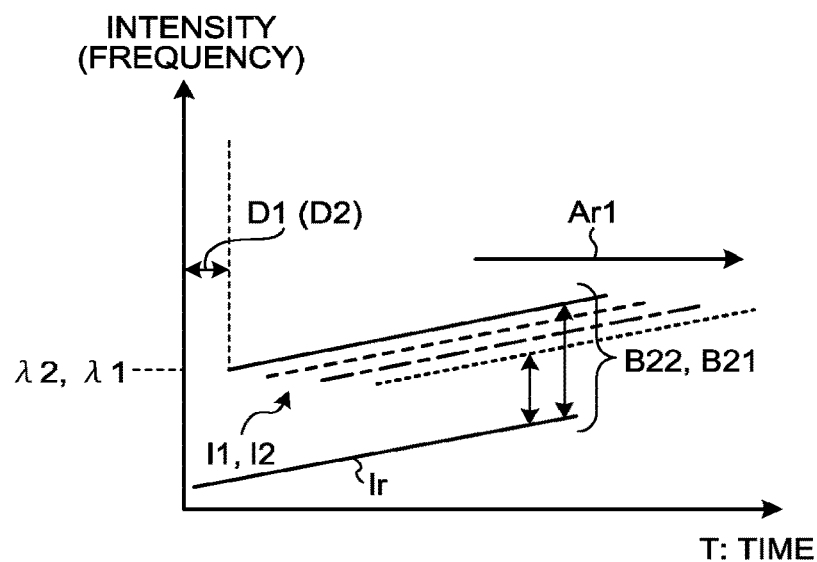
FIG. 7E illustrates an operation of a coupler.
Figure 7F:
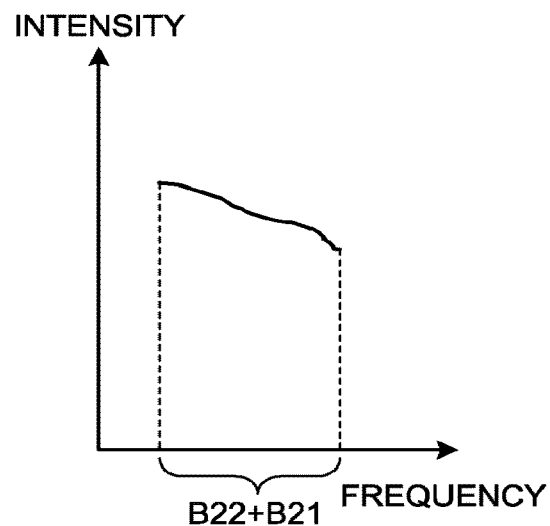
FIG. 7F illustrates a time variation of a measured waveform.

After that, the electric signal caused by the back-scattered light L1A is subjected to frequency shift, by effects of the mixer 25 and the delay track 27, by a shift S3 that is identical in absolute value to, but different in code from, the shift S1 as illustrated in FIG. 7D, and is subjected to a delay D2 of which amount is identical to that of the delay D1. After that, when the coupler 28 couples the electric signal propagated through the delay track 27 with the electric signal propagated through the band-pass filter 24b, properties of the two electric signals are overlapped as illustrated in FIG. 7E. As a result, the intensity distribution waveform (OFDR waveform) of the frequency of the interference light observed at the frequency analysis unit 16 is one to which frequency property of the interference intensities at B21 and B22 are overlapped as illustrated in FIG. 7F. That is, the OFDR waveform obtained here is of a value obtained by adding together intensities of the back-scattered lights from two points separated by distances identical to optical path lengths of two light paths between the split coupler 4 and the multiplexing coupler 8 at each point, in the longitudinal direction, of the optical fiber FUT to be measured. By observing temporal variation of this intensity distribution, temporal fluctuations of intensity and frequency of an acoustic wave propagating through the optical fiber FUT to be measured may be obtained as an average value between the two points.

Third Embodiment

Figure 8:
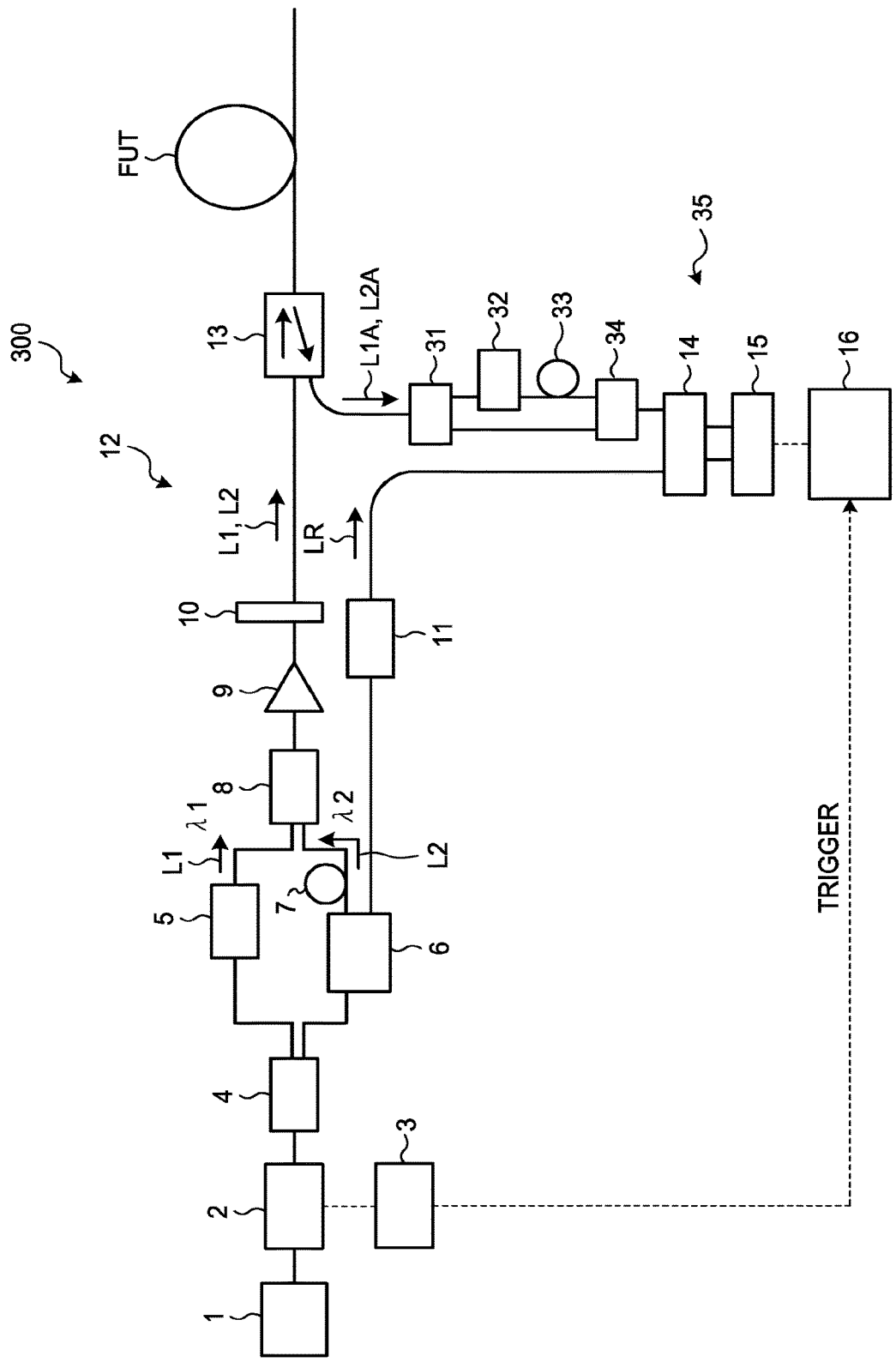
FIG. 8 is a schematic view of an optical fiber sensor according to a third embodiment.

FIG. 8 is a schematic view of an optical fiber sensor according to a third embodiment. As illustrated in FIG. 8, similarly to the optical fiber sensor 100 illustrated in FIG. 1A, an optical fiber sensor 300 includes the transmitting unit 12 and the optical circulator 13. The optical fiber sensor 300 further includes a measuring unit 35 including a split coupler 31, a frequency shifter 32, a delay optical fiber 33, a multiplexing coupler 34, the multiplexing coupler 14, the balanced PD 15, and the frequency analysis unit 16.

Explanation of a function of the transmitting unit 12 will be omitted.

The measuring unit 35 will be explained. The split coupler 31 splits the back-scattered lights L1A and L2A into two. The frequency shifter 32 shifts a frequency of one of the lights output from the split coupler 31 by a constant amount. The delay optical fiber 33 propagates the light output by the frequency shifter 32 therethrough. The multiplexing coupler 34 multiplexes the other one of the lights output from the split coupler 31 with the light output from the delay optical fiber 33. The multiplexing coupler 14 multiplexes the reference light LR with the light output from the multiplexing coupler 34. The balanced PD 15 receives the multiplexed lights, generates an electric signal including a beat signal by an interference light generated by the reference light LR and the back-scattered lights L1A and L2A, and outputs to the frequency analysis unit 16. The frequency analysis unit 16 performs a frequency analysis to a desirable frequency area of the electric signal.

Herein the delay time by the delay optical fiber 33 is set to coincide with a delay time by an optical path length difference of the two light paths between the split coupler 4 and the multiplexing coupler 8 in the transmitting unit 12. A frequency shift amount by the frequency shifter 32 will be explained later.

Figure 9A:
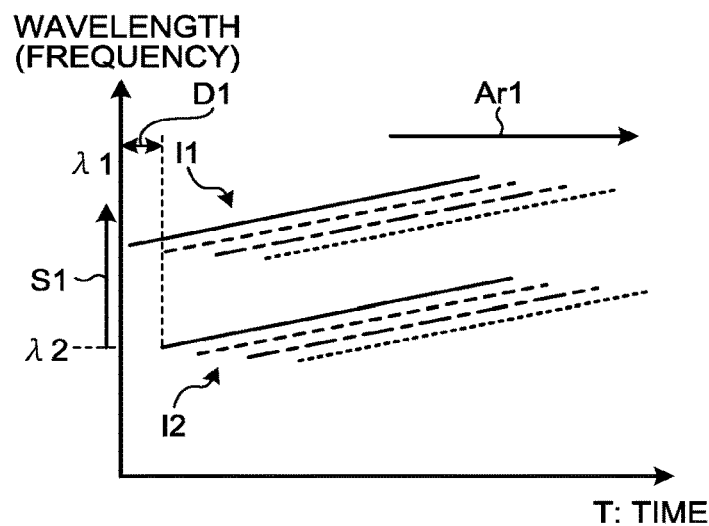
FIG. 9A illustrates temporal wavelength (frequency) variation of light.
Figure 9B:
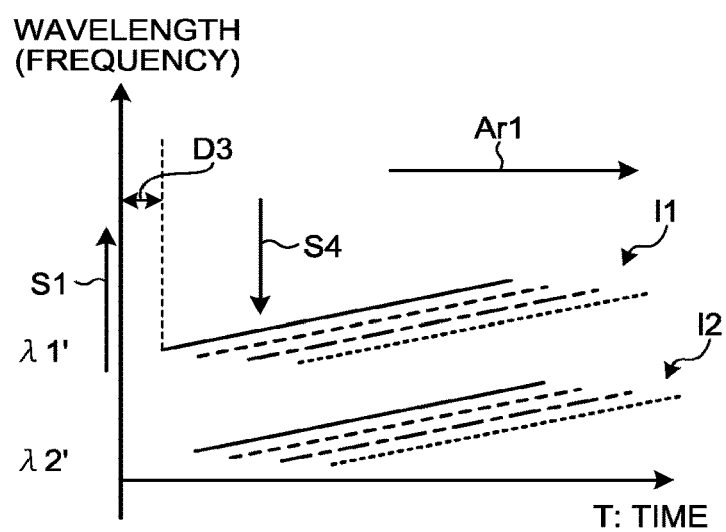
FIG. 9B illustrates temporal wavelength (frequency) variation of light.
Figure 9C:
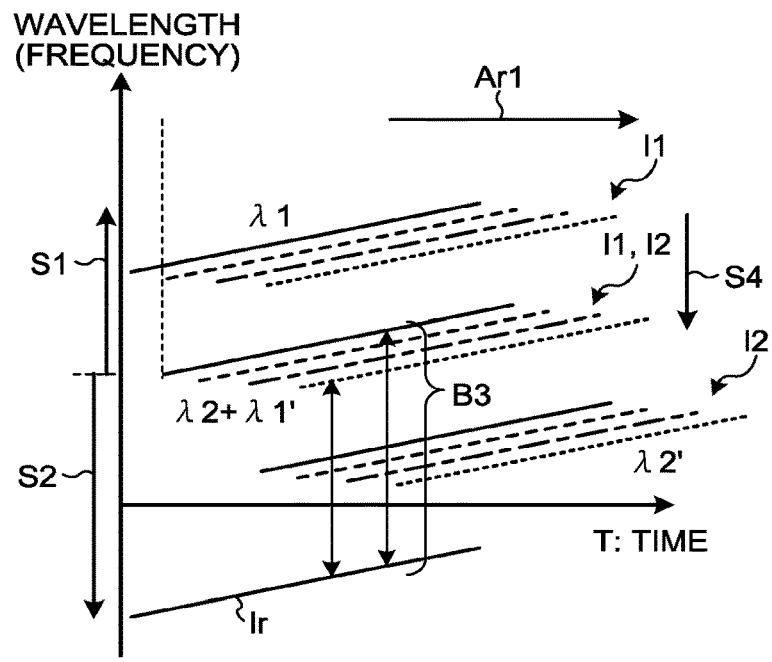
FIG. 9C illustrates temporal wavelength (frequency) variation of light.

FIGS. 9A to 9C are views illustrating temporal wavelength (frequency) variations of lights. At first, as illustrated in FIG. 9A, the back-scattered light L1A is subjected to frequency shift by the shift S1. The delay D1 is a delay time by the optical path length difference of the two light paths between the split coupler 4 and the multiplexing coupler 8. Next FIG. 9B illustrates states of the back-scattered lights L1A and L2A propagating through the frequency shifter 32 and the delay optical fiber 33. As illustrated in FIG. 9B, the frequency shifter 32 further shifts the back-scattered lights L1A and L2A to an opposite side of a shift direction of the shift S1 (a shift S4). Moreover, the back-scattered lights L1A and L2A are delayed by the delay optical fiber 33 by a delay D3. The delay D3 is identical to the delay D1 in amount. Wavelengths of the back-scattered lights L1A and L2A in this state corresponding to $\lambda 1$ and $\lambda 2$ (that is, when wavelengths are not modulated) are indicated by $\lambda 1'$ and $\lambda 2'$.

FIG. 9C illustrates a state in which the multiplexing coupler 34 multiplexes the other one of lights output from the split coupler 31 with the light output from the delay optical fiber 33, and after that, the multiplexing coupler 14 further multiplexed with the reference light LR. As illustrated in FIG. 9C, the back-scattered light L1A ($\lambda 1'$) transmitted through the frequency shifter 32 and the back-scattered light L2A ($\lambda 2$) not transmitted through the frequency shifter 32 vary in wavelength similarly, and are overlapped and interfere. Then only a frequency area (B3) of an interference light of this light of $\lambda 1'+\lambda 2$ and the reference light LR is measured by the frequency analysis unit 16. Hereby, a distribution state of interference between the two points separated by an optical path length difference $\Delta 1$ of the two light paths between the split coupler 4 and the multiplexing coupler 8 in the longitudinal direction of the optical fiber FUT to be measured may be measured. Moreover, a behavior of an acoustic wave in the optical fiber FUT to be measured may be measured from a time variation of the distribution state.

Fourth Embodiment

Figure 10:
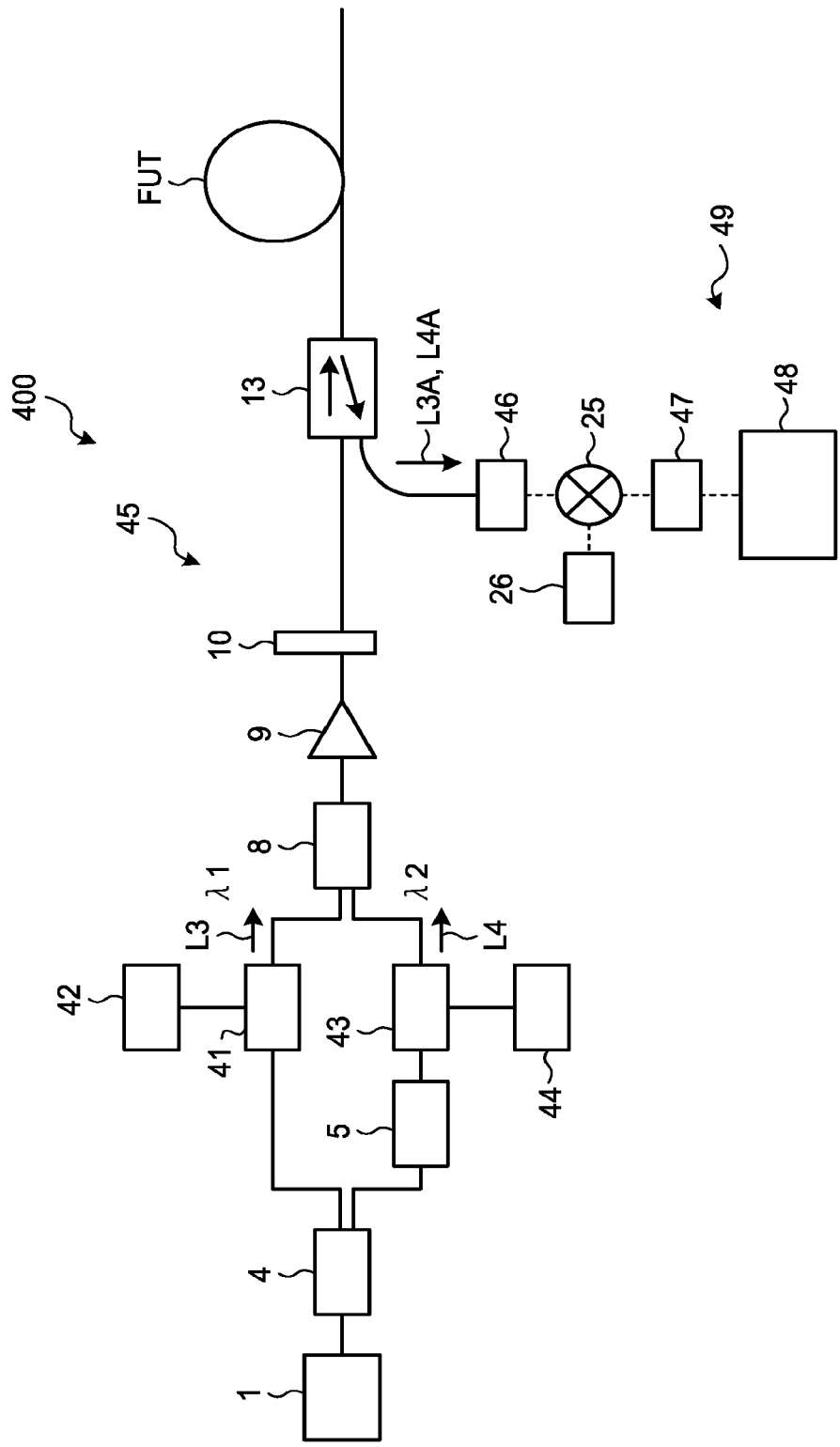
FIG. 10 is a schematic view of an optical fiber sensor according to a fourth embodiment.

FIG. 10 is a schematic view of an optical fiber sensor according to a fourth embodiment. As illustrated in FIG. 10, an optical fiber sensor 400 includes a transmitting unit 45 and the optical circulator 13. The transmitting unit 45 includes the light source 1, the split coupler 4, a modulator 41, a signal-generator 42, the frequency shifter 5, a modulator 43, a signal-generator 44, the multiplexing coupler 8, the EDFA 9, and the band-pass filter 10. The optical fiber sensor 400 further includes a measuring unit 49 including a PD 46 as a light-receiving unit, the mixer 25, the signal-generator 26, a band-pass filter 47, and a temporal-fluctuation-detecting unit 48. Although a trigger signal for adjusting timing is input from the signal-generators 42 and 44 to the temporal-fluctuation-detecting unit 48, the trigger signal is omitted in the drawing. In Embodiments below as well, a trigger signal for adjusting timing is input from the signal-generator to the temporal-fluctuation-detecting unit 48.

In the transmitting unit 45, the split coupler 4 splits light output from the light source 1 into two. The modulator 41 varies one of lights output from the split coupler 4 periodically by the modulation signal delivered from the signal-generator 42.

The frequency shifter 5 shifts a frequency of the other one of the lights output from the split coupler 4 by a constant amount. The modulator 43 varies a wavelength of light output from the frequency shifter 5 periodically by the modulation signal delivered from the signal-generator 44. The multiplexing coupler 8 multiplexes the lights L3 and L4 together output from the modulators 41 and 43 and outputs as the two lights L3 and L4. Wavelengths, at a point in time at which the wavelengths are not modulated, of the lights L3 and L4 are indicated by λ1 and λ2 respectively.

When the lights L3 and L4 are input to the optical fiber FUT to be measured, back-scattered lights L3A and L4A are generated by Rayleigh scattering from the lights L3 and L4. The back-scattered lights L3A and L4A propagate through the optical fiber FUT to be measured in the opposite direction to the lights L3 and L4 and are output by the optical circulator 13 to the measuring unit 49.

In the measuring unit 49, the PD 46 receives the back-scattered lights L3A and L4A and generates an electric signal. The mixer 25 multiplexes the electric signal output by the PD 46 with a sine wave signal output from the signal-generator 26 at a predetermined frequency. The band-pass filter 47 transmits the electric signal of a frequency component of the frequency of the sine wave signal therethrough and outputs to the temporal-fluctuation-detecting unit 48.

Herein the band-pass filter 47 may be a low-pass filter as well. The mixer 25, the signal-generator 26, and the band-pass filter 47 serve as a frequency-selecting unit selecting a specific frequency component from the electric signal. The temporal-fluctuation-detecting unit 48 detects a temporal fluctuation of the electric signal of the selected frequency component.

Herein a frequency of the sine wave signal input from the signal-generator 26 to the mixer 25 is set to be a frequency shift amount given by the frequency shifter 5. The electric signal output from the mixer 25 in this state is transmitted through the band-pass filter 47 (low-pass filter) which transmits only low frequency therethrough. Hereby an interference signal of the lights at the two wavelengths scattered from the same point at the specific time of the back-scattered lights L3A and L4Back-scattered from the optical fiber FUT to be measured are finally obtained. A temporal intensity variation of this signal is measured in synchronization with a modulation frequency f. Then, since a distribution of the interference signal over the entire length of the optical fiber FUT to be measured is known, this is collected per every modulation sweep. By obtaining a difference for a temporal intensity variation of interference light obtained per sweep, a time variation of an interference state between sweeps may be obtained. The temporal-fluctuation-detecting unit 48 detects a signal in synchronization with a cycle of the modulation signal applied to the modulators 41 and 43 at the transmitting unit 45. Hereby a temporal variation of interference intensity at each point, in the longitudinal direction, of the optical fiber FUT to be measured may be observed. Moreover, a phase variation, that is, an intensity and a frequency of an acoustic wave propagating through the optical fiber FUT to be measured may be calculated from variation of its temporal interference intensity. A device which is capable of measuring a temporal variation of an electric signal may be used as the temporal-fluctuation-detecting unit 48, for example, an oscilloscope and a device performing digital conversion to an analog voltage signal and then analyzing the signal by using a computer and the like may be used.

On the other hand, in the transmitting unit 45, a wavelength of light output from the light source 1 is varied at a certain cycle by the modulators 41 and 43. The variation of the wavelength varies linearly relative to time variation respectively. Herein the modulation cycles of the modulators 41 and 43 are identical. A cycle is determined based on a length of the optical fiber FUT to be measured, and a time length of reciprocation of the light over the entire length of the optical fiber FUT to be measured may be defined as a modulation cycle. Although the frequency shifter 5 is provided in upstream to the modulator 43, the frequency shifter 5 may be provided in downstream to the modulator 43 and may be provided in upstream or downstream to the modulator 41. By shifting a constant frequency amount by the frequency shifter 5, since a frequency difference between the two lights in the vicinity of the near end of the optical fiber FUT to be measured may be increased, an interference frequency may be measured even at the near end clearly.

Figure 11A:
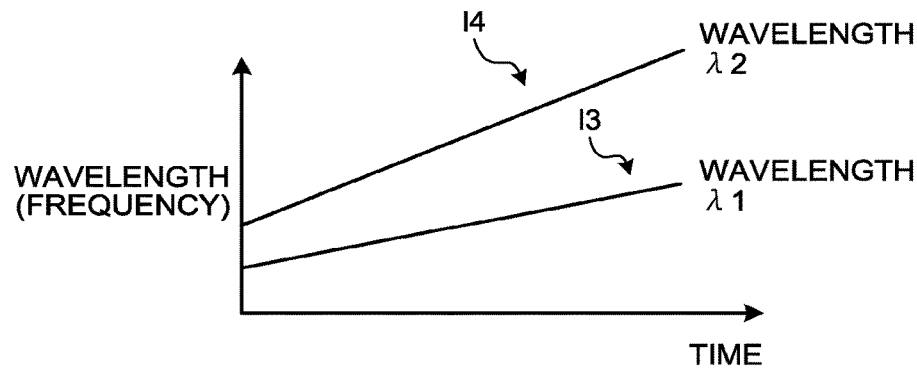
FIG. 11A illustrates temporal wavelength (frequency) variation of light.
Figure 11B:
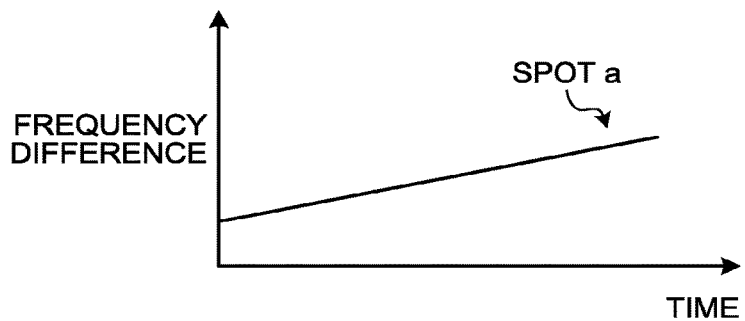
FIG. 11B illustrates temporal wavelength (frequency) variation of light.
Figure 11C:
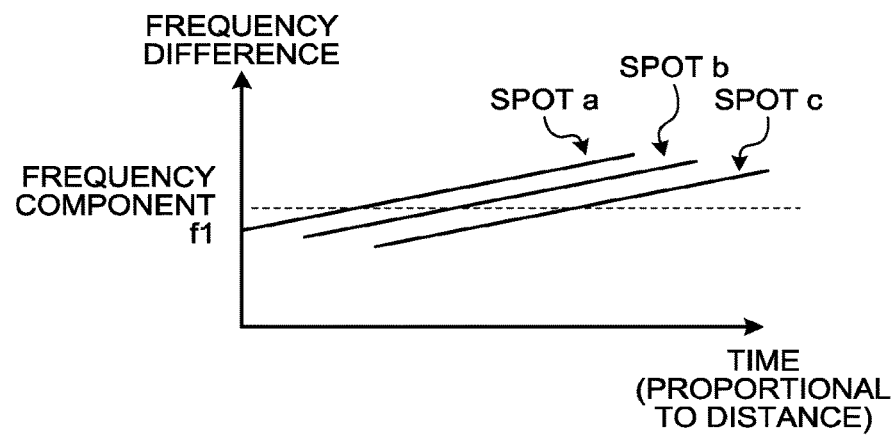
FIG. 11C illustrates a temporal variation of an interference frequency of an interference light of back-scattered light.

FIGS. 11A to 11C are views illustrating temporal wavelength (frequency) variations of lights and temporal variations of interference frequencies of interference lights of back-scattered lights. FIG. 11A illustrates temporal wavelength (frequency) variations of the lights L3 and L4. A line 13 indicates the light L3, and a line 14 indicates the light L4. As illustrated in FIG. 11A, in the fourth embodiment, since the time variations of the wavelengths of the lights L3 and L4 by the modulators 41 and 43 are configured to differ, inclinations of the lines 13 and 14 differ. FIG. 11B illustrates a temporal variation of an interference frequency (frequency difference) of back-scattered lights L3A and L4A from a specific spot a of the optical fiber FUT to be measured. Since the time variations of the wavelengths of the lights L3 and L4 are configured to differ, the interference frequency varies temporally as well. An interference frequency (frequency difference) of the back-scattered light L3A from a point other than the spot a of the optical fiber FUT to be measured also makes a temporal variation similarly to FIG. 11B. For example, FIG. 11C illustrates temporal variations of the interference frequencies (frequency differences) of the back-scattered light L3A from the spot a and from spots b and c of the optical fiber FUT to be measured. Herein the spots a, b and c are supposed to be close to the transmitting unit 45 in an order of a, b and c.

As illustrated in FIG. 11C, although the inclinations of the variations of the interference frequencies of the back-scattered lights from the respective points are identical, the frequencies are shifted due to the difference in distances from the near end of the optical fiber FUT to be measured. Therefore, if an arbitrary frequency component of an interference frequency area (indicated as f1 in FIG. 11C) is selected and extracted by the frequency-selecting unit of the measuring unit 49 and a temporal variation of its component is measured, it is possible to measure a distribution of the interference light of the back-scattered light from the longitudinal direction of the optical fiber FUT to be measured.

Since the optical fiber FUT to be measured extends and contracts when an acoustic wave propagates through the optical fiber FUT to be measured, an interference state of the interference light of the two back-scattered lights L3A and L4A having been measured varies. Therefore, a propagation position, a frequency, and intensity information of an acoustic wave propagating through the optical fiber FUT to be measured may be calculated from the phase variation of the interference light.

Figure 12A:
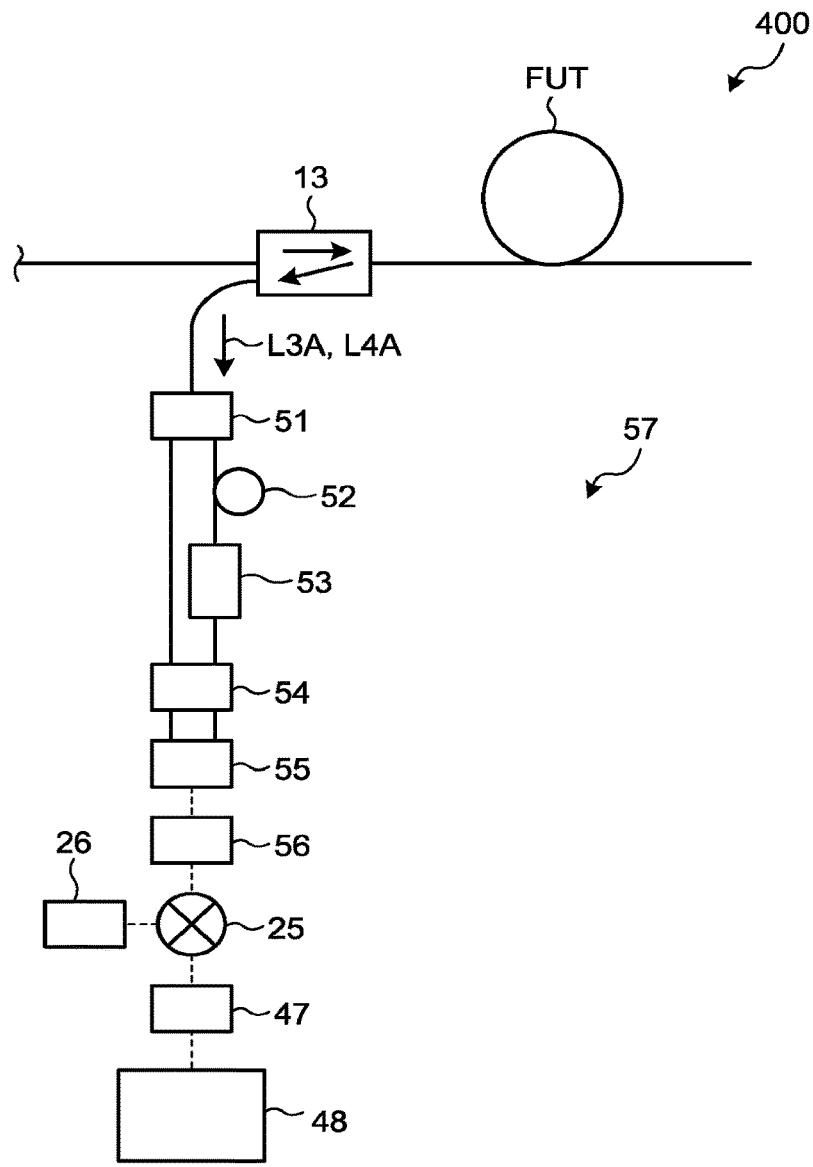
FIG. 12A is a view for explaining another example of a configuration of a measuring unit of an optical fiber sensor according to the fourth embodiment.

FIG. 12A is a view for explaining another example of a configuration of a measuring unit of the optical fiber sensor 400 according to the fourth embodiment. In the configuration example, a measuring unit 57 includes a split coupler 51 splitting the back-scattered lights L3A and L4A into two, a delay optical fiber 52 propagating one of lights output from the split coupler 51, a frequency shifter 53 shifting a frequency of light output from the delay optical fiber 52 by a constant amount, a multiplexing coupler 54 multiplexing the other one of the lights output from the split coupler 51 with light output from the frequency shifter 53, a balanced PD 55 receiving light output from the multiplexing coupler 54 and generating an electric signal, a band-pass filter 56 forming a frequency-selecting unit selecting a specific frequency component from the electric signal, the mixer 25, the signal-generator 26, the band-pass filter 47, and the temporal-fluctuation-detecting unit 48 detecting a temporal fluctuation of the electric signal of the selected frequency component.

Figure 12B:
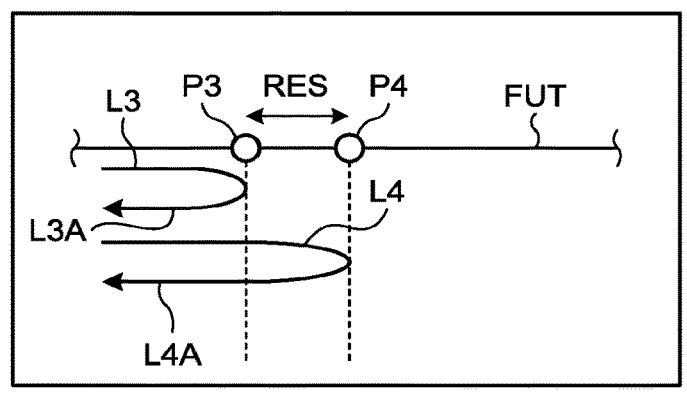
FIG. 12B is a view for explaining back-scattered light.

Herein, as an object to be measured for calculating an acoustic wave in an acoustic wave measurement using the measuring unit having the configuration illustrated in FIGS. 10 and 12A, back-scattered-light-to-back-scattered-light interference as illustrated in FIG. 12B will be considered which is generated at a specific time from arbitrary two points P3 and P4, of the optical fiber FUT to be measured, separated by an arbitrary distance. The back-scattered light L3A is generated from the light L3 at the point P3, and the back-scattered light L4A is generated from the light L4 at the point P4. The measuring unit configured as illustrated in FIGS. 10 and 12A measures a time variation of an interference state of the back-scattered lights L3A and L4A, and obtains a phase variation and an intensity variation of light between arbitrary two points P3 and P4. From this phase variation, a time variation of a frequency and a vibration intensity of an acoustic wave propagating through the optical fiber between the two points P3 and P4 is obtained. Therefore, a distance between the two points P3 and P4, for which the interference is measured, is a distance resolution RES in this case.

The measuring unit 57 illustrated in FIG. 12A will be explained. Herein the light L4 output from the transmitting unit 45 illustrated in FIG. 10 is indicated by a modulation light (1), and a frequency shift amount which the light L4 is subjected by the frequency shifter 5 is indicated by Δfa. The light L3 is indicated by a modulation light (2).

The back-scattered lights L3A and L4A by the lights L3 and L4 are split into two by the split coupler 51. One of lights output from the split coupler 51 is propagated through the delay optical fiber 52, and after that, a constant amount of frequency shift is applied by the frequency shifter 53. This frequency shift amount is indicated by Δfb. The other one of the lights output from the split coupler 51 is multiplexed with light output from the frequency shifter 53 at the multiplexing coupler 54. A difference of two light paths between the split coupler 51 and the multiplexing coupler 54 in this state is indicted by Ala where an optical path at the delay optical fiber 52's side is longer. Herein, as will be explained later, the frequency shift amount Δfb applied by the frequency shifter 53 for the modulation light (1) is set so that a periodically-frequency-varying area of the modulation light (1)' and a periodically-frequency-varying area of the modulation light (1) are not overlapped. When a length of the optical fiber FUT to be measured is indicated by L, and a time rate of change of an optical frequency of the modulation light (1) is indicated by γ(unit: Hz/s), a condition for the Δfb is as follows.

Δfb>γnL/c (c: speed of light, n: effective refractive index of the optical fiber FUT to be measured)

Figure 13A:
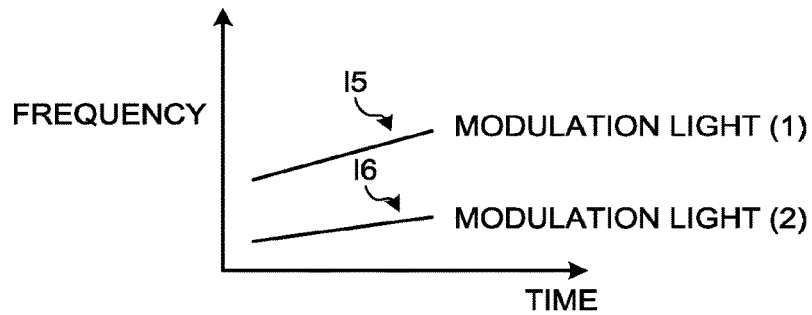
FIG. 13A illustrates a relationship between temporal variations of wavelengths of two lights.
Figure 13B:
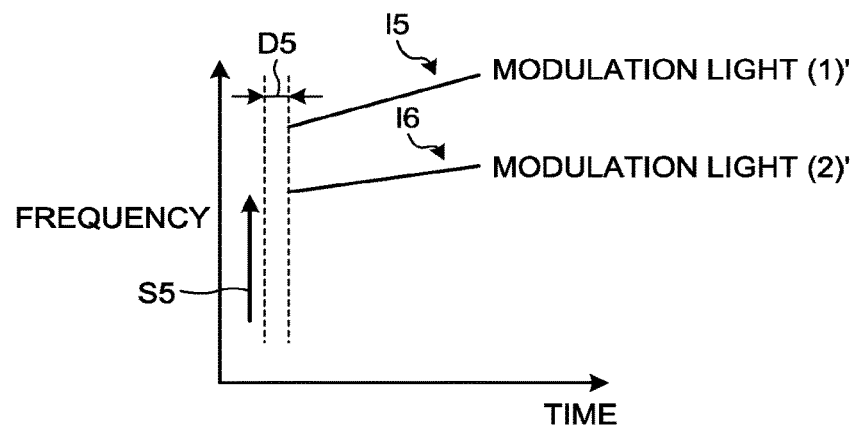
FIG. 13B illustrates a relationship between temporal variations of wavelengths of two lights.
Figure 13C:
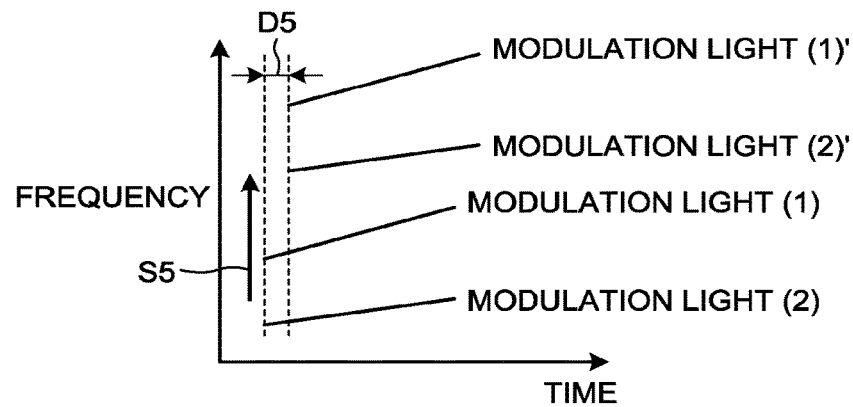
FIG. 13C illustrates a relationship between temporal variations of wavelengths of two lights.
Figure 13D:
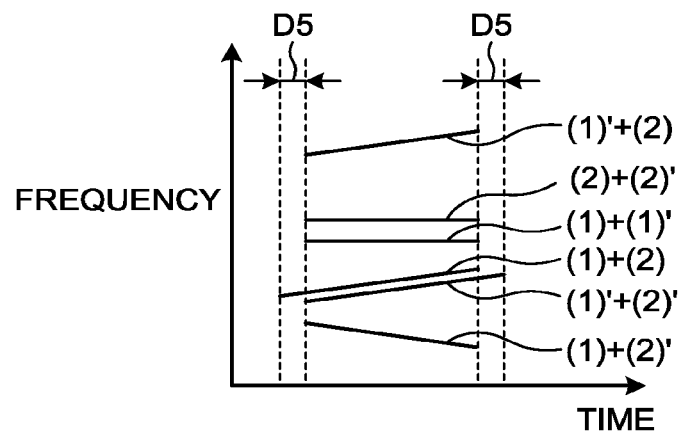
FIG. 13D illustrates a relationship between temporal variations of wavelengths of two lights.

FIG. 13A TO 13E illustrate temporal frequency variations of two lights. In FIG. 13A, a line 15 illustrates back-scattered light by the modulation light (1), and a line 16 illustrates back-scattered light by the modulation light (2). FIG. 13B illustrates a temporal frequency variation of light split by the split coupler 51 illustrated in FIG. 12A, propagating through the delay optical fiber 52, and after that, propagating through the frequency shifter 53. Herein, the modulation lights (1) and (2) become modulation lights (1)' and (2)' respectively. A delay D5 is a delay by the delay optical fiber 52, and a shift S5 is a frequency shift by the frequency shifter 53. FIG. 13C illustrates a temporal frequency variation of light multiplexed by the multiplexing coupler 54. Herein interferences are generated among the modulation lights (1), (2), (1)', and (2)'. FIG. 13D illustrates time variations of interference beat frequencies among these four lights. For example, (1)'+(2) illustrates a time variation of the interference beat frequency between the modulation light (1)' and the modulation light (2). A frequency difference between two modulation lights appear in the interference beat frequency. Therefore, for example, the interference beat frequency of (1)+(1)' is constant temporally.

Figure 13E:
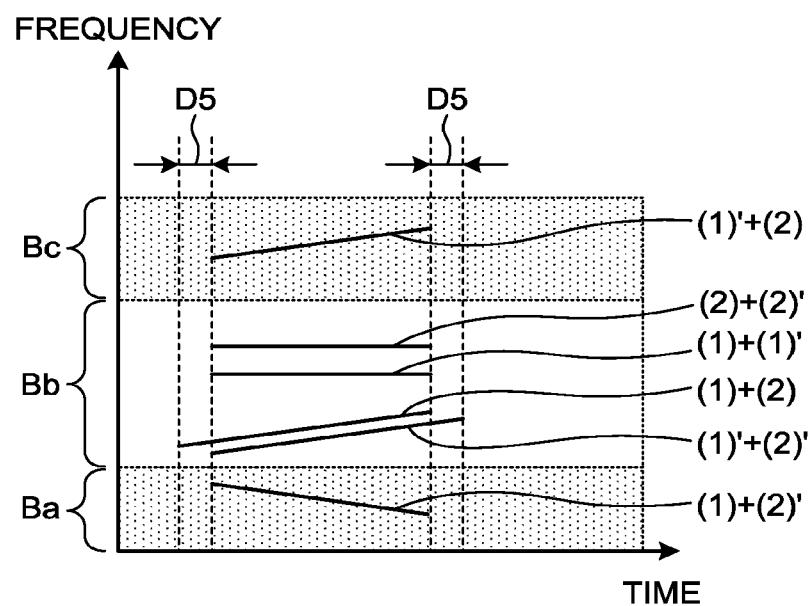
FIG. 13E illustrates a relationship between temporal variations of wavelengths of two lights.

Herein, the interference signal required for calculating the acoustic wave is an interference signal between the modulation light (1) and (2)' or between the modulation light (1)' and (2) where the frequency varies temporally. Therefore, as illustrated in FIG. 13E, when frequency areas are divided into Ba (an area including an interference signal of the modulation lights (1) and (2)'), Bb (areas including interference signals of the modulation lights (1)' and (1), the modulation lights (2) and (2)', the modulation lights (1) and (2), and the modulation lights (1)' and (2)'), and Bc (an area including an interference signal of the modulation lights (1)' and (2)), it is found that only frequency component of the area Ba or Bc may be detected. Therefore, in the measuring unit 57 illustrated in FIG. 12A, it is set so that an arbitrary constant frequency of Ba or Bc is extracted from an output of the balanced PD 55, and a time variation of its frequency component may be measured. More specifically, the electric signal output from the balanced PD 55 transmits through the band-pass filter 56 transmitting an area of Ba or Bc therethrough, and after that, the electric signal is multiplexed with the sine wave signal from the signal-generator 26 by the mixer 25. Herein, an output from the mixer 25 becomes an electric signal of a frequency component of a difference between the electric signal transmitted through the band-pass filter and the sine wave signal output from the signal-generator 26. A frequency of the sine wave signal is set so that the frequency of this difference becomes a desirable frequency for the area Ba or Bc. The output from the mixer 25 transmits through the band-pass filter 47 as a filter (low-pass filter) having a property of cutting a high frequency component, and is output to the temporal-fluctuation-detecting unit 48. The temporal-fluctuation-detecting unit 48 is, for example, an oscilloscope, and is capable of measuring a temporal variation of the electric signal input thereinto and having the desirable frequency of the area Ba or Bc. Hereby, a distribution of an interference state of the two back-scattered lights in the longitudinal direction of the optical fiber FUT to be measured may be measured.

Figure 14A:
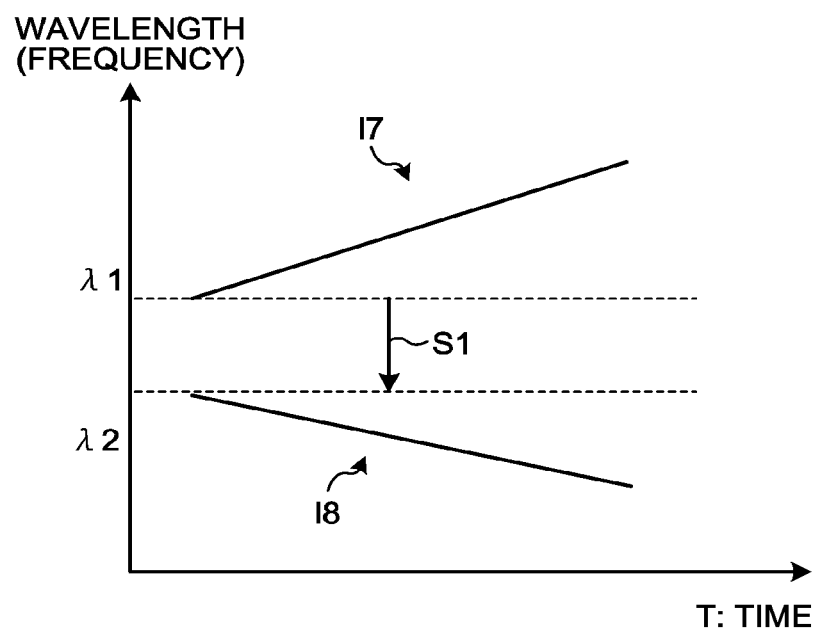
FIG. 14A illustrates another example of a relationship between temporal variations of wavelengths of two lights.
Figure 14B:
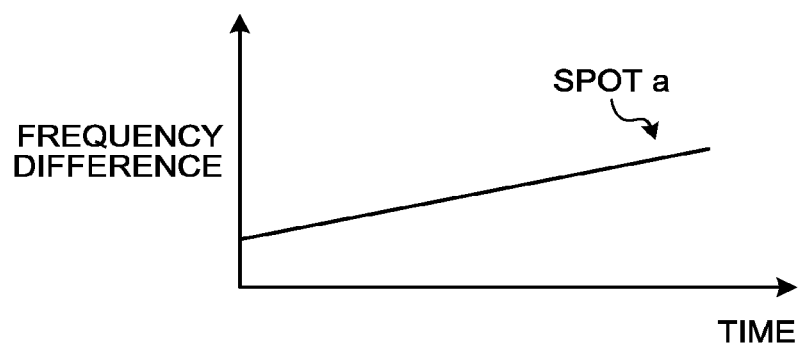
FIG. 14B illustrates another example of a relationship between temporal variations of wavelengths of two lights.
Figure 14C:
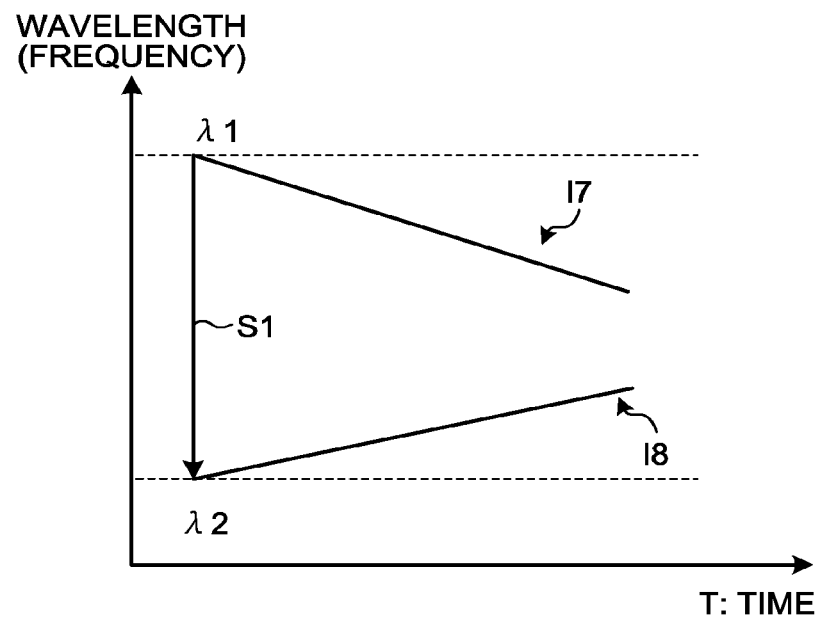
FIG. 14C illustrates yet another example of a relationship between temporal variations of wavelengths of two lights.
Figure 14D:
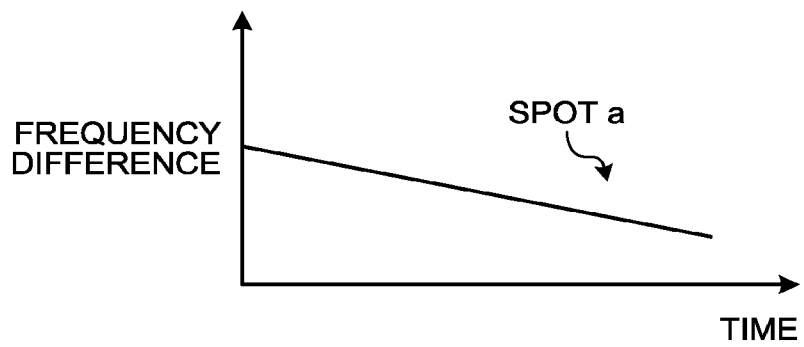
FIG. 14D illustrates yet another example of a relationship between temporal variations of wavelengths of two lights.

Directions of sweeping temporal wavelengths applied by the modulators 41 and 43 in the transmitting unit 45 in FIG. 10 (direction in which a wavelength increases or decreases from an initial state) may be set to be opposite between the modulators 41 and 43 (an increase in wavelength and a decrease in wavelength). FIG. 14A illustrates a case in which the light L3 indicated by a line 17 and the light L4 indicated by a line 18 increase in wavelength difference as time proceeds. The shift S1 is a frequency shift performed by the frequency shifter 5. In this case, as illustrated in FIG. 14B, an interference frequency back-scattered at the arbitrary point a in the longitudinal direction of the optical fiber FUT to be measured and observed by the measuring unit varies so that a frequency difference between the two lights increases as time proceeds. On the other hand, FIG. 14C illustrates a case in which the light L3 indicated by the line 17 and the light L4 indicated by the line 18 are set to decrease in wavelength difference as time proceeds. In this case, as illustrated in FIG. 14D, an interference frequency back-scattered at the arbitrary point a in the longitudinal direction of the optical fiber FUT to be measured and observed by the measuring unit varies so that a frequency difference between the two lights decreases as time proceeds.

Fifth Embodiment

Figure 15:
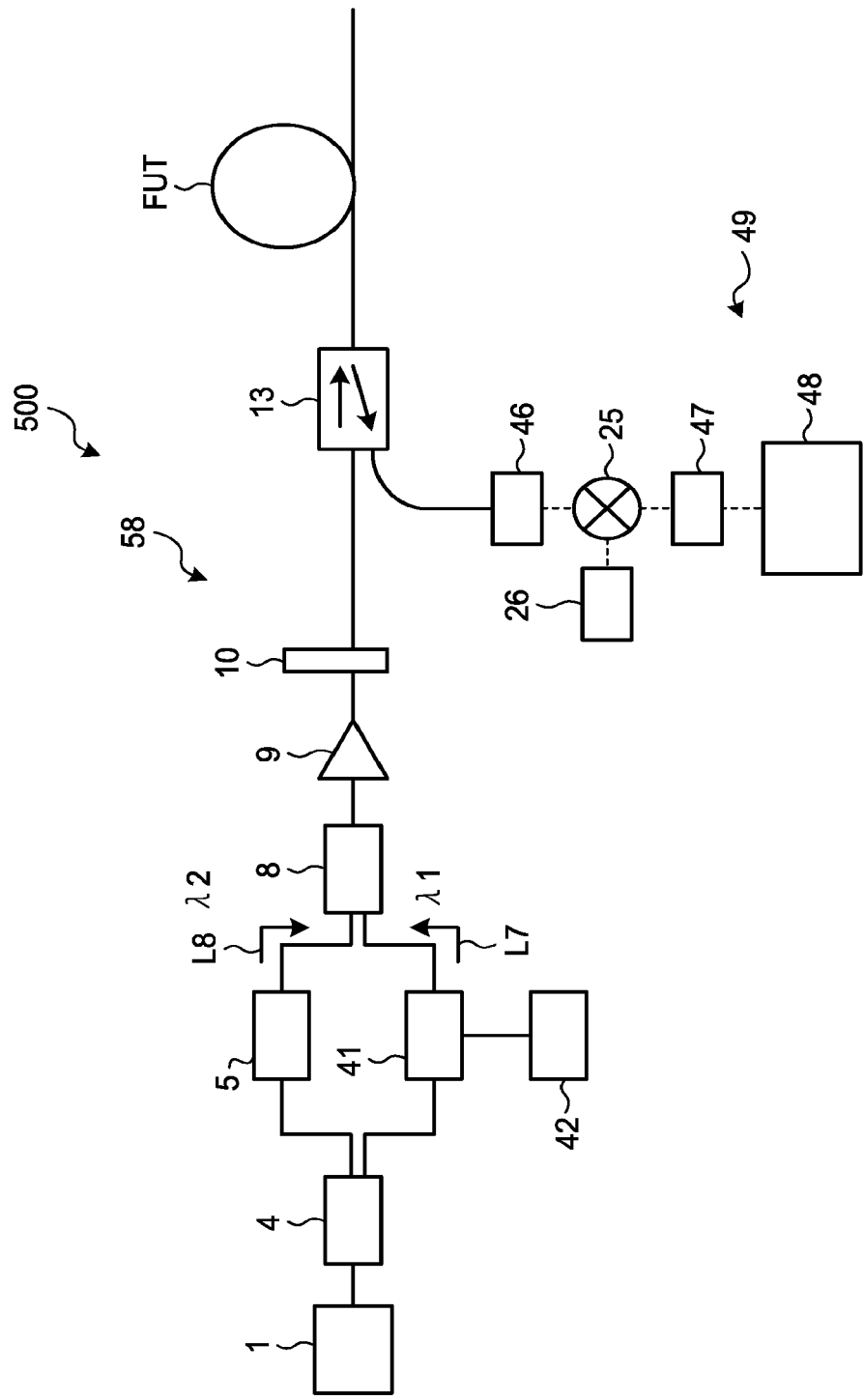
FIG. 15 is a schematic view of an optical fiber sensor according to a fifth embodiment.

FIG. 15 is a schematic view of an optical fiber sensor according to a fifth embodiment. As illustrated in FIG. 15, an optical fiber sensor 500 includes a transmitting unit 58, the optical circulator 13, and the measuring unit 49 configured similarly to the optical fiber sensor 400.

The transmitting unit 58 includes the light source 1, the split coupler 4, the modulator 41, the signal-generator 42, the frequency shifter 5, the multiplexing coupler 8, the EDFA 9, and the band-pass filter 10.

The split coupler 4 splits light output from the light source 1 into two. The modulator 41 varies a wavelength of one of lights output from the split coupler 4 periodically by a modulation signal delivered from the signal-generator 42. The frequency shifter 5 shifts a frequency of the other one of the lights output from the split coupler 4 by a constant amount. The multiplexing coupler 8 multiplexes lights L7 and L8 together output from the modulator 41 and the frequency shifter 5 and outputs two lights L7 and L8 to the optical fiber FUT to be measured. λ1 and λ2 indicate wavelengths of the lights L7 and L8 respectively when the lights are not modulated.

Although this transmitting unit 58 varies periodically the wavelength of one of the lights output from the split coupler 4, the transmitting unit 58 merely shifts the frequency, by a constant amount, of the other one of the lights output from the split coupler 4 and do not vary the wavelength periodically.

Figure 16A:
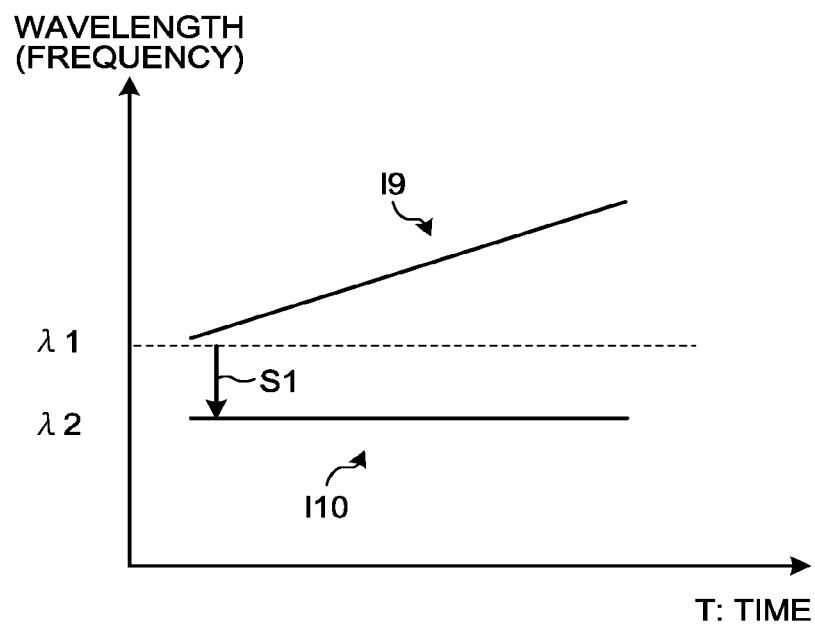
FIG. 16A illustrates temporal wavelength (frequency) variations of two lights in the optical fiber sensor according to the fifth embodiment.
Figure 16B:
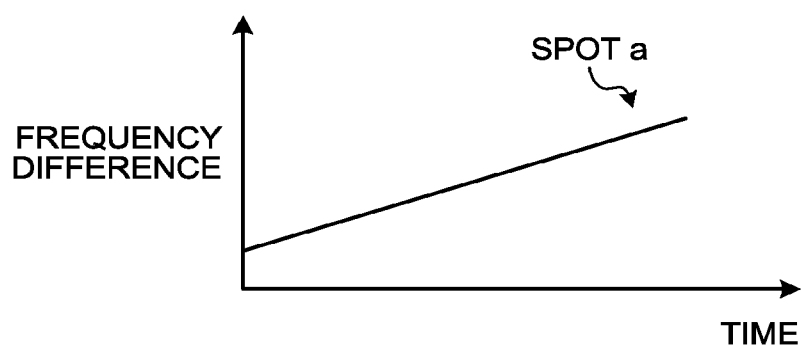
FIG. 16B illustrates a temporal variation of an interference frequency of an interference light of back-scattered light.

FIGS. 16A and 16B are views illustrating temporal wavelength (frequency) variations of lights and temporal variations of interference frequency of an interference light of back-scattered light. FIG. 16A illustrates temporal wavelength (frequency) variations of the lights L7 and L8. A line 19 indicates the light L7, and the line 110 indicates the light L8. As illustrated in FIG. 16A, in the fifth embodiment, since a wavelength of the only light L7 is varied periodically by the modulator 41, the line 19 is inclined and the line L10 is not inclined. FIG. 16B illustrates a temporal variation of an interference frequency (frequency difference) of back-scattered light by the lights L7 and L8 from the specific spot a of the optical fiber FUT to be measured. Since the time variation amounts of the wavelengths of the lights L7 and L8 are configured to differ, the interference frequency as well varies periodically. An interference frequency (frequency difference) of the back-scattered light from a point other than the spot a of the optical fiber FUT to be measured also has a temporal variation similarly to FIG. 16B. That is, the interference frequencies of the interference lights of the two back-scattered lights are of different values in respective points in the longitudinal direction of the optical fiber FUT to be measured. Therefore, similarly to the case of the fourth embodiment, by extracting an arbitrary frequency component from the interference frequency area of the electric signal detected by the PD 46 in the measuring unit 49 and measuring its temporal intensity variation, it is possible to obtain variations of the interference intensities of the two back-scattered lights in the optical fiber FUT to be measured, and thus it is possible to measure a distribution of an interference state of the two back-scattered lights in the longitudinal direction of the optical fiber FUT to be measured.

Although frequency shift is performed to the light L7 in the fifth embodiment, the frequency shift may not be performed.

Sixth Embodiment

Figure 17:
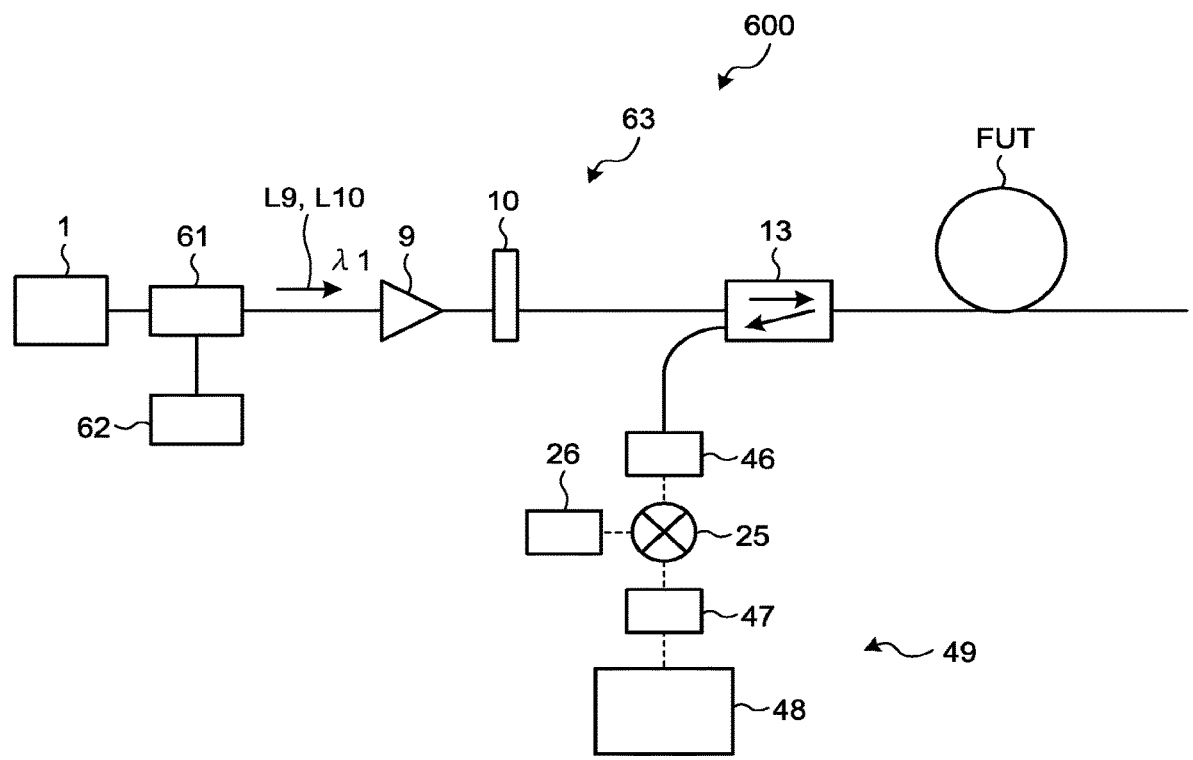
FIG. 17 is a schematic view of an optical fiber sensor according to a sixth embodiment.

FIG. 17 is a schematic view of an optical fiber sensor according to a sixth embodiment. As illustrated in FIG. 17, an optical fiber sensor 600 includes a transmitting unit 63, the optical circulator 13, and the measuring unit 49 configured similarly to the optical fiber sensor 400. The transmitting unit 63 includes the light source 1, a modulator 61, a signal-generator 62, the EDFA 9, and the band-pass filter 10.

The modulator 61 modulates light, which is a continuous light having a singular frequency and a wavelength λ1, output from the light source 1 in accordance with a sine wave signal delivered from the signal-generator 62. Herein, a modulation method by the modulator 61 is configured to generate a sideband wave component across a center frequency (carrier frequency) component, as a center, of light input to the modulator 61 and on both sides separated from the carrier frequency by the modulation frequency. Although it depends on a modulation method as to whether the carrier frequency component remains or decreases, both of the cases may be employed for the modulation method. In the sixth embodiment, a carrier suppression modulation (CS-RZ modulation) is supposed to be employed in which the carrier frequency component decreases, and the sideband wave component is generated on both sides separated from the carrier frequency by the modulation frequency.

Figure 18A:
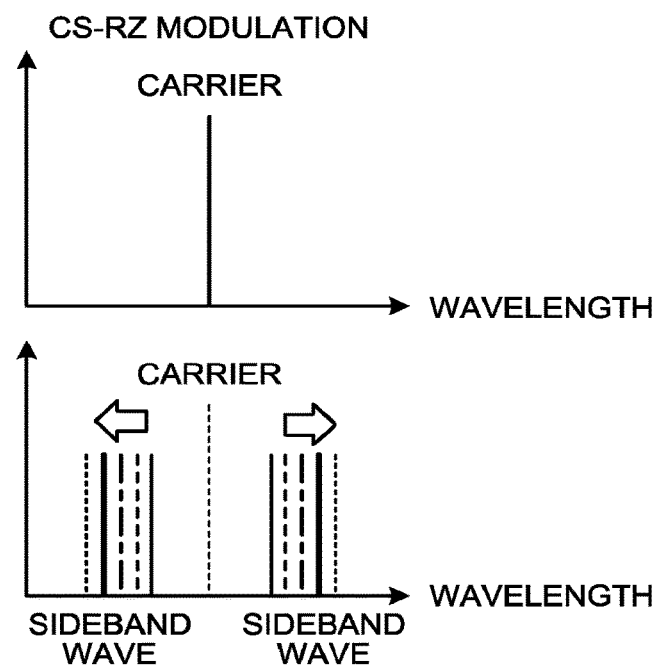
FIG. 18A illustrates temporal wavelength (frequency) variations of two lights in the optical fiber sensor according to the sixth embodiment.
Figure 18B:
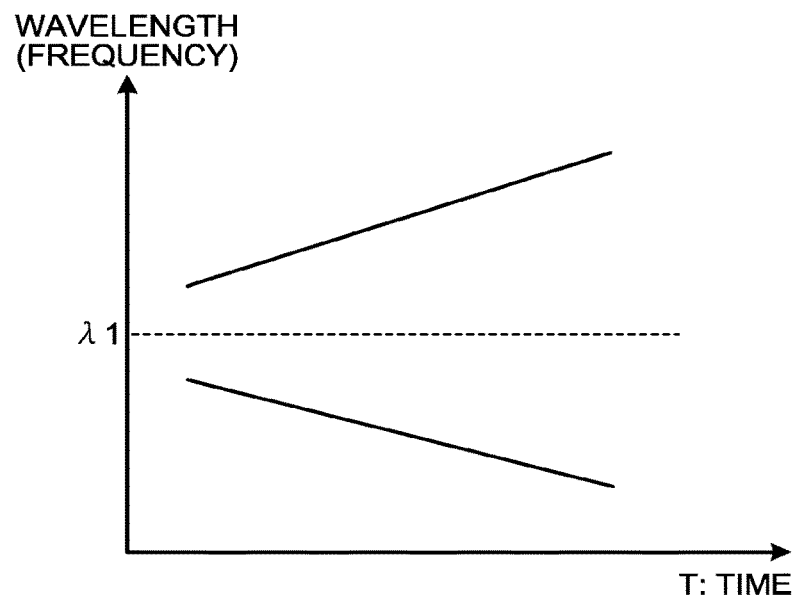
FIG. 18B illustrates temporal wavelength (frequency) variations of two lights in the optical fiber sensor according to the sixth embodiment.
Figure 18C:
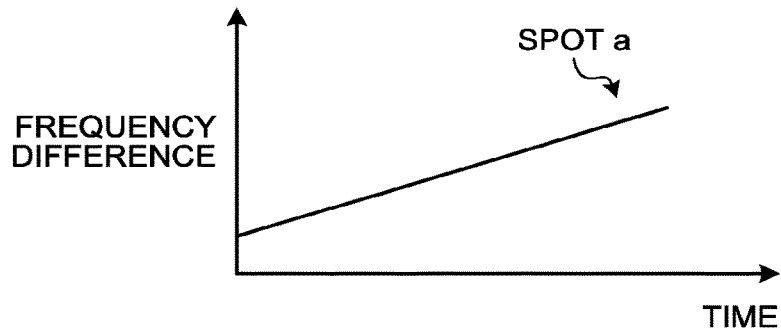
FIG. 18C illustrates a temporal variation of an interference frequency of an interference light of back-scattered light.

FIGS. 18A to 18C are views illustrating temporal wavelength (frequency) variations of two lights and temporal variations of interference frequencies of interference lights of back-scattered lights in the optical fiber sensor according to the sixth embodiment. As illustrated in FIG. 18A, when the CS-RZ modulation is performed, the carrier frequency component decreases to a sufficient low degree, and only its sideband wave component appears. In this state, by increasing the frequency of the sine wave signal delivered from the signal-generator 62 periodically and temporally, the sideband wave varies so that its frequency (wavelength) deviates from a carrier periodically and temporally. Then, the wavelengths of the two lights L9 and L10 as sideband waves vary so as to increase periodically and temporally across λ1, as the center, that is a wavelength corresponding to the carrier frequency as illustrated in FIG. 18B. The transmitting unit 63 makes these two lights L9 and L10 propagate through the EDFA 9 and the band-pass filter 10, and then outputs to the optical fiber FUT to be measured. Then, as illustrated in FIG. 18C, interference frequencies (frequency differences) of the back-scattered lights by the lights L9 and L10 from the specific spot a of the optical fiber FUT to be measured varies temporally. An interference frequency (frequency difference) of the back-scattered light from a point other than the spot a of the optical fiber FUT to be measured also makes a temporal variation similarly to FIG. 18C. That is, the interference frequencies of the interference lights of the two back-scattered lights are of different values in respective points in the longitudinal direction of the optical fiber FUT to be measured. Therefore, similarly to the case of the fourth embodiment, by extracting an arbitrary frequency component from the interference frequency area of the electric signal detected by the PD 46 in the measuring unit 49 and measuring its temporal intensity variation, it is possible to obtain variations of the interference intensities of the two back-scattered lights, and thus it is possible to measure a distribution of an interference state of the two back-scattered lights in the longitudinal direction of the optical fiber FUT to be measured.

The frequency of the sine wave signal delivered from the signal-generator 62 is not limited to a case of increasing periodically and temporally, and the frequency may be decreased periodically and temporally.

Other Configuration of Measuring Unit

Figure 19:
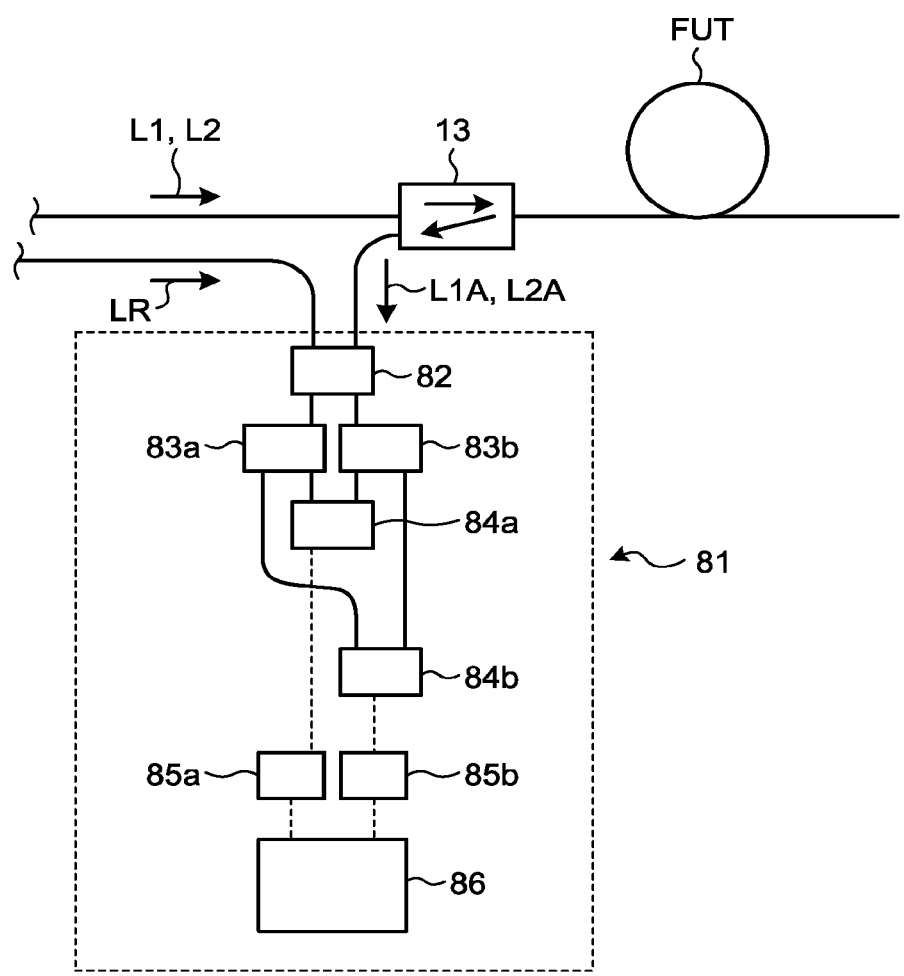
FIG. 19 is a schematic view of another example of a measuring unit.

FIG. 19 is a schematic view of another example of the measuring unit. This measuring unit 81 is capable of being used as the measuring unit of the optical fiber sensor according to the first to the third embodiments and configured to perform a polarization-diversity-receiving. The polarization-diversity-receiving is a method of decreasing an interference noise caused by a polarization fluctuation of light in an optical fiber and stabilizing variations of interference states by splitting an optical signal into two polarization states and observing the respective interference states.

As illustrated in FIG. 19, the measuring unit 81 includes a multiplexing/demultiplexing coupler 82, polarization beam splitters 83a and 83b, balanced PDs 84a and 84b, AD conversion units 85a and 85b, and a signal-processing unit 86. The multiplexing/demultiplexing coupler 82 and the polarization beam splitters 83a and 83b constitute a polarization diversity unit.

The multiplexing/demultiplexing coupler 82 multiplexes the reference light LR (for example, see the first embodiment) with the back-scattered lights L1A and L2A by the lights L1 and L2 from the optical fiber FUT to be measured, then splits into two, and outputs to the polarization beam splitters 83a and 83b. The polarization beam splitters 83a and 83b split the lights input thereinto to two polarization states of lights (P wave and S wave). This P wave includes a P wave component of the reference light LR and P wave components of the back-scattered lights L1A and L2A. The S wave includes an S wave component of the reference light LR and S wave components of the back-scattered lights L1A and L2A. The balanced PD 84a receives the P waves from the polarization beam splitters 83a and 83b respectively, and generates electric signals corresponding to the received lights. The balanced PD 84b receives the S waves from the polarization beam splitters 83a and 83b respectively, and generates electric signals corresponding to the received lights. The AD conversion units 85a and 85b receive the electric signals from the balanced PDs 84a and 84b respectively and convert the received electric signals from analog signals to digital signals. The signal-processing unit 86 serves as a frequency analysis unit, performs a signal-processing to the received digital signals, and then analyzes the processed signals. Hereby a measurement of the interference state may be performed more stably.

It is preferable that the constituent units from the light source 1 to the optical circulator 13 of the transmitting unit in the above-described embodiments (the light source, the modulator, the split coupler, the frequency shifter, the delay optical fiber, the multiplexing coupler, the EDFA, the band-pass filter, the optical circulator, the optical fiber connecting these units, and the like) include a polarization maintaining optical fiber and a polarization maintaining optical component for maintaining a polarization state of light. That is, by forming the positions through which the light output from the light source 1 transmits in these constituent components with the polarization maintaining optical fiber and the polarization maintaining optical component maintaining the polarization state of the transmitting light, an influence of the polarization fluctuations of the two lights output to the optical fiber FUT to be measured is avoided. Hereby a more stable measurement may be performed.

Moreover, when at least one of the two lights or the reference light output to the optical fiber FUT to be measured is subjected to polarization scramble, the interference noise by the polarization fluctuation of the light may be reduced, and thus, the variation of the interference state may be stabilized. In order to achieve this, a publicly known polarization scrambler may be provided to an optical path for at least one of the two lights or the reference light.

Configuration Including Timing-Adjusting Unit

In the optical fiber sensor according to each of the above-described Embodiments, a trigger signal for adjusting timing is input from the signal-generator to the frequency analysis unit or a temporal-fluctuation-detecting unit. However, when the transmitting unit makes the wavelength of the light vary temporally and periodically, the wavelength may vary non-linearly sometimes even if attempting to vary, for example, linearly. In this case, synchronization of sweeping may not be achieved sufficiently sometimes at the frequency analysis unit or the temporal-fluctuation-detecting unit by the trigger signal alone from the signal-generator. To solve this, the optical fiber sensor may further include a timing-adjusting unit which will be explained below.

Figure 20:
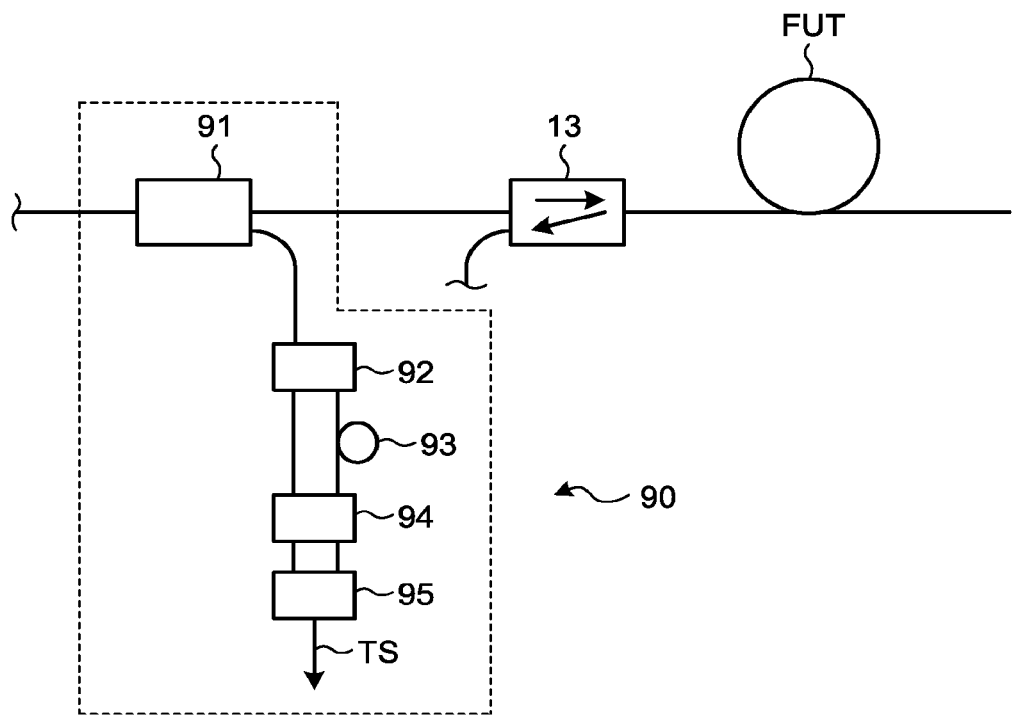
FIG. 20 is a schematic view of a timing-adjusting unit.

FIG. 20 is a schematic view of the timing-adjusting unit. A timing-adjusting unit 90 includes a split coupler 91 for supplementary interferometer splitting units of two lights output from the transmitting unit, a split coupler 92 receiving the lights split by the split coupler 91 for supplementary interferometer and splitting these lights into two, a delay optical fiber 93 propagating one of lights output from the split coupler 92, a multiplexing coupler 94 multiplexing the other one of the lights output from the split coupler 92 with the light output from the delay optical fiber 93, and a balanced PD 95 receiving the light output from the multiplexing coupler 94 and outputting a detection trigger signal TS as a timing-adjusting electric signal. The split coupler 92, the delay optical fiber 93, the multiplexing coupler 94, and the balanced PD 95 configure a self-interferometric supplementary interferometer.

The detection trigger signal TS is input into a signal-generator of the transmitting unit or into the frequency analysis unit or the temporal-fluctuation-detecting unit of the measuring unit and is used for adjusting at least one of timings of temporal variations of wavelengths of two lights at the transmitting unit or a timing of an electric signal detection at the measuring unit.

For example, the detection trigger signal TS is used as a trigger signal for controlling a detection timing at the frequency analysis unit and the temporal-fluctuation-detecting unit. Hereby, since the detection may be performed at a timing having compensated for a frequency fluctuation (an unintended fluctuation) output from the light source in the transmitting unit, a non-linearity of wavelength modulation in the transmitting unit may be compensated for.

The timing-adjusting unit 90 as such may be added to and used in, for example, any one of the above-described first to sixth embodiments. Moreover, the timing-adjusting unit 90 as such and a configuration performing the polarization-diversity-receiving as illustrated in FIG. 19 may be incorporated together into, added to, and used in the optical fiber sensor of the embodiments.

Other Example of Light Source Unit

Figure 21A:
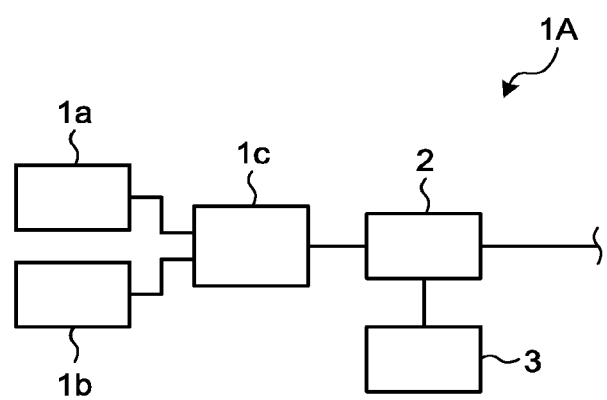
FIG. 21A is a schematic view of another example of a light source unit.
Figure 21B:
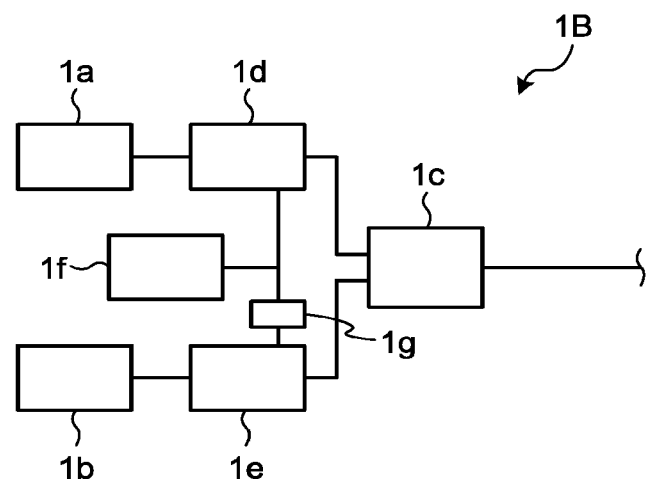
FIG. 21B is a schematic view of yet another example of a light source unit.

FIGS. 21A and 21B are schematic views of other examples of the light source unit. FIG. 21A illustrates a light source unit 1A. The light source unit 1A is configured by two light sources 1a and 1b outputting lights of which wavelengths differ from each other (for example, wavelengths λ1 and λ2 respectively), a WDM coupler 1c multiplexing lights together output from the two light sources 1a and 1b, the modulator 2 modulating lights output from the WDM coupler 1c, and a signal-generator 3 delivering a modulation signal to the modulator 2. FIG. 21B illustrates a light source unit 1B. The light source unit 1B is configured by two light sources 1a and 1b outputting lights of which wavelengths differ from each other (for example, wavelengths λ1 and λ2 respectively), modulators 1d and 1e modulating lights output from the two light sources 1a and 1b respectively, a signal-generator if delivering a modulation signal to the modulators 1d and 1e, a delay unit 1g applying a delay to a modulation signal delivered from a signal-generator if to the modulator 1e, and a WDM coupler 1c multiplexing lights output from the modulators 1d and 1e together. As described above, the light source unit may include two light sources. The light source units 1A and 1B may be used in place of its light source unit in any one of, for example, the above-described first to fifth embodiments. Moreover, the light source units 1A and 1B as such and the configuration performing the polarization-diversity-receiving as illustrated in FIG. 19 may be incorporated to and used in the optical fiber sensor.

In the optical fiber sensor according to the above-described Embodiments, by configuring the length of the optical fiber FUT to be measured at 10 km, a measurement distance for measurement of an acoustic wave may be 10 km at maximum. Moreover, as described above, the distance resolution for measurement of an acoustic wave by the optical fiber sensor according to the above-described Embodiments is equivalent to a distance between two different points in the longitudinal direction of the optical fiber FUT to be measured for which interference state is measured. Therefore, in the configuration illustrated in, for example, FIG. 10, by adjusting modulation frequencies applied to the modulators 41 and 43 and adjusting a transmission frequency of the band-pass filter, a measurement with an equal to or less than 10 cm of distance resolution may be achieved. More specifically, when a length of the optical fiber FUT to be measured is 10 km, a transmission bandwidth of the band-pass filter 47 is 10 kHz. When frequency variation applied by the modulators 41 and 43 are the variations illustrated in FIG. 14A, it is achieved by using 10 THz/s of time rate of change γ (unit: Hz/s) of this frequency.

Measurement Method Using Optical Fiber Sensor

Various kinds of measurement methods using the optical fiber sensor according to Embodiments of the present disclosure as an acoustic wave sensor will be explained. Although a case using the optical fiber sensor 100 according to the first embodiment will be explained below, any one of the optical fiber sensors according to the above-described Embodiments may be used.

Figure 22A:
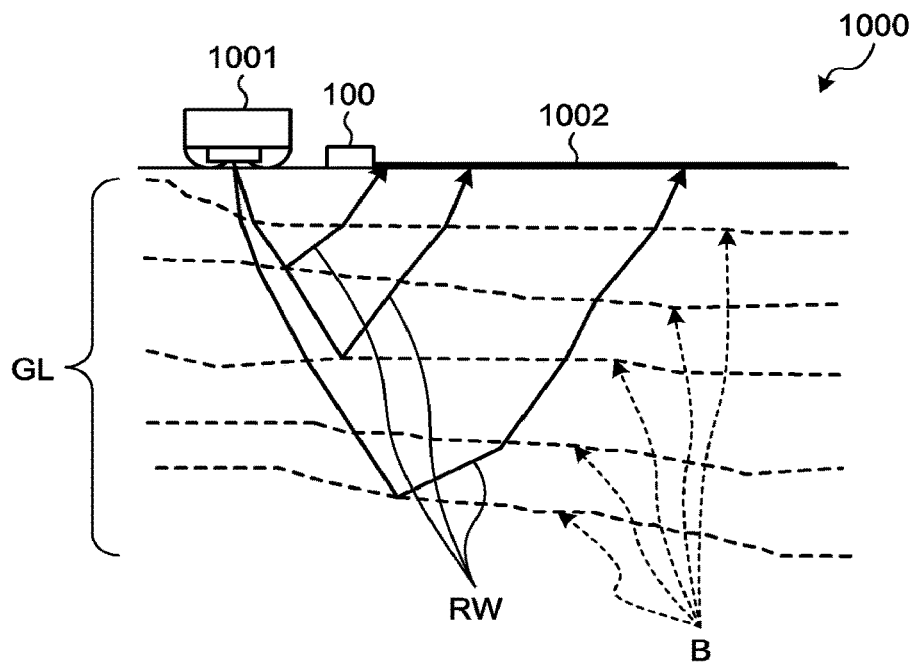
FIG. 22A is a view for explaining a seismic prospecting method.
Figure 22B:
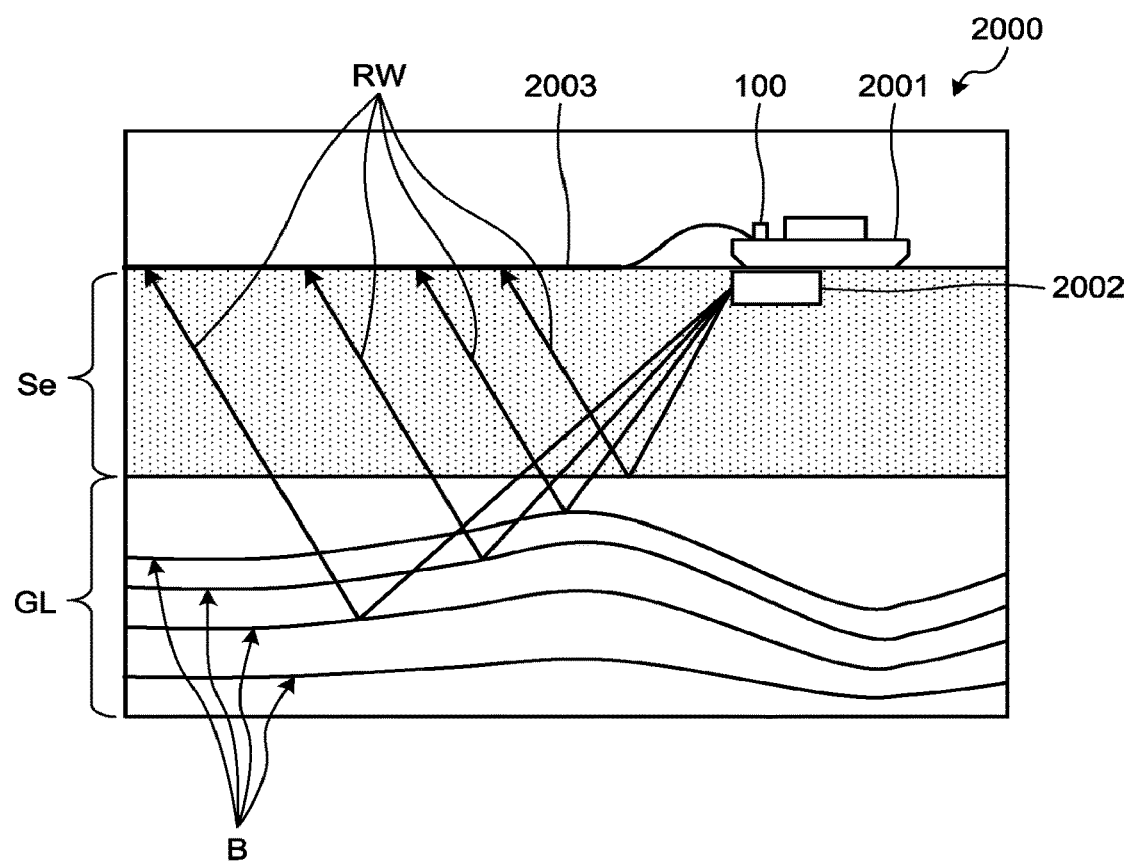
FIG. 22B is a view for explaining a seismic prospecting method.

FIGS. 22A and 22B are views for explaining a seismic prospecting method performed to use the optical fiber sensor according to Embodiments of the present disclosure and called a seismic reflection method. The seismic prospecting method is a method of causing an earthquake wave artificially and investigating, based on that, the structure of the earth interior. In the seismic reflection method, a state of an acoustic wave generated on a geosphere (a bed boundary surface on which speed and density vary mainly) reflected at and returning from a reflection surface in the ground is captured, and then, a subsurface structure is explored by using information of its arrival time and the like. This method is used for resource exploration for mainly petroleum and coal, and in addition, for fault investigation along with frequent occurrence of earthquake and investigation of continental shelf in a sea area etc.

FIG. 22A illustrates an example of an on-shore seismic prospecting. In the example, the seismic prospecting method is performed by using a seismic prospecting system 1000 including an earthquake simulation vehicle 1001, an optical fiber cable 1002 as an optical fiber subjected to measurement, and an optical fiber sensor 100. In the method, when an acoustic wave is generated by the earthquake simulation vehicle 1001, a reflected acoustic wave RW returns from a boundary surface B of an underground stratum GL and reaches the optical fiber cable 1002 installed on the ground. The acoustic wave generated by the optical fiber of the optical fiber cable 1002 is measured by the optical fiber sensor 100 using the reflected acoustic wave RW.

FIG. 22B illustrates an example of undersea seismic prospecting. In the example, the seismic prospecting is performed by using a seismic prospecting system 2000. The seismic prospecting system 2000 includes a survey vehicle 2001, an air gun 2002 mounted on the survey vehicle 2001, an optical fiber cable 2003 as an optical fiber subjected to measurement, and the optical fiber sensor 100 mounted on the survey vehicle 2001. In the method, the optical fiber cable 2003 is floated from the survey vehicle 2001 on a sea surface of sea Se. An acoustic wave generated by the air gun 2002 from the survey vehicle 2001 is transmitted through the sea and the reflected acoustic wave RW returns from the boundary surface B of the stratum GL of a seabed and reaches the optical fiber cable 2003 floated on the sea surface. The acoustic wave generated in the optical fiber of the optical fiber cable 2003 is measured by the optical fiber sensor 100 using the reflected acoustic wave RW.

Figure 23:
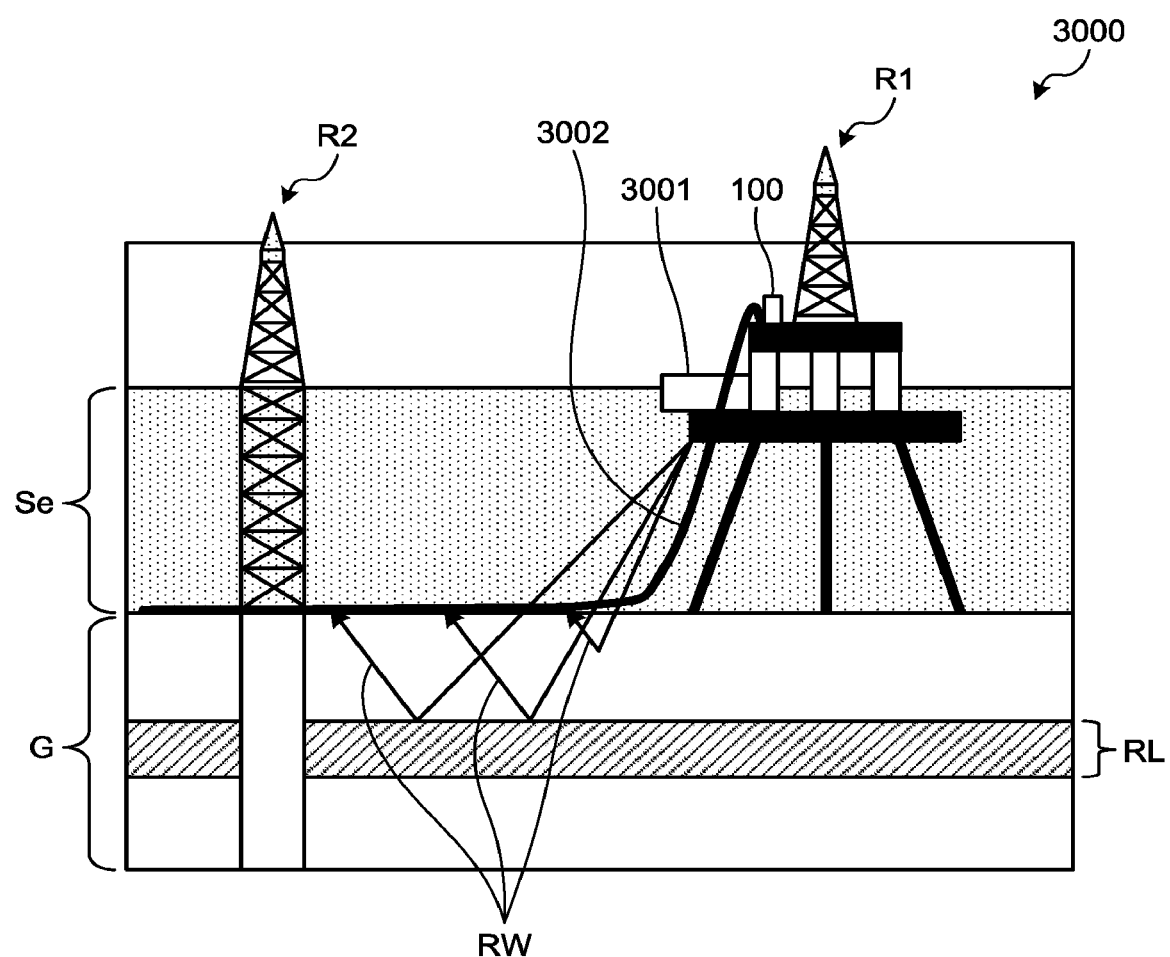
FIG. 23 is a view for explaining a method of measuring a reservoir layer distribution.

FIG. 23 is a view for explaining a measurement method for a reservoir layer distribution. In the example, a measurement is performed by setting a measurement system 3000 including an air gun 3001, an optical fiber cable 3002 as an optical fiber subjected to measurement, and the optical fiber sensor 100 in the vicinity of a seabed well petroleum or natural gas.

The optical fiber cable 3002 is laid on a seabed above a reservoir layer RL for petroleum and natural gas buried in an underground G beneath the seabed of the sea Se. Among offshore rigs R1 and R2 set on the sea surface of the sea Se, the optical fiber sensor 100 is set to the offshore rig R1. An acoustic wave generated by the air gun 3001 is propagated from the offshore rig R1 into the undersea. The acoustic wave is transmitted from the seabed to the reservoir layer RL in which petroleum and natural gas exist, and is reflected at a boundary surface with a stratum. The reflected acoustic wave RW reaches the optical fiber cable 3002 set on the seabed. The acoustic wave generated in the optical fiber of the optical fiber cable 3002 is measured by the optical fiber sensor 100 using the reflected acoustic wave RW. Since a reflection state of the acoustic wave varies based on reserved states of petroleum and natural gas in the reservoir layer RL, it is possible to perceive distribution states of petroleum and natural gas in the reservoir layer RL.

Figure 24:
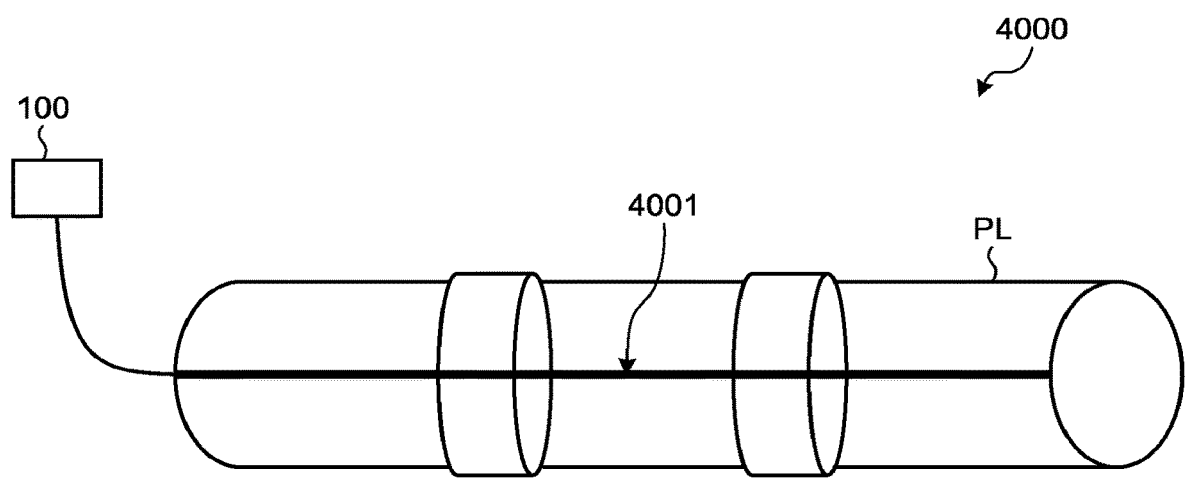
FIG. 24 is a view for explaining a strain detection method.

FIG. 24 is a view for explaining a strain detection method. In FIG. 24, a detection system 4000 is configured by an optical fiber 4001 as an optical fiber subjected to measurement set along a side surface or an outer side surface in a pipe line PL transferring petroleum and gas and the optical fiber sensor 100. A vibration (acoustic wave) received by the optical fiber 4001 varies in accordance with variation in flow amount of petroleum and gas flowing through the pipe line PL. Hereby the acoustic wave generated in the optical fiber 4001 is measured by the optical fiber sensor 100. Hereby it is possible to perceive how petroleum and gas flow in the longitudinal direction of the pipe line PL.

Figure 25:
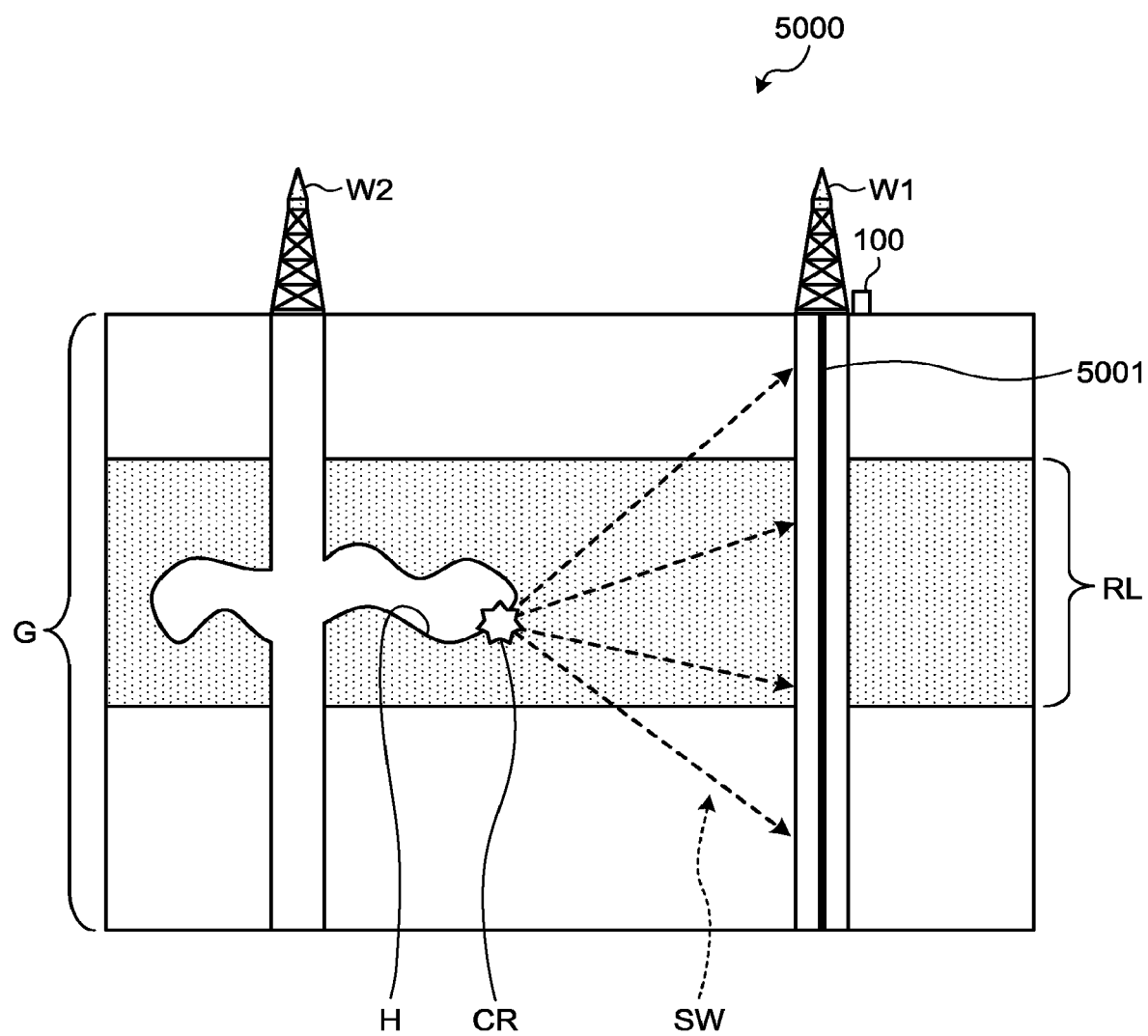
FIG. 25 is a view for explaining a method of specifying a position of a fissure in a stratum.

FIG. 25 is a view for explaining a method of specifying a position of a fissure in a stratum. In FIG. 25, a case of specifying a position of a crack generated when using a hydraulic-fracturing method used when digging shale gas or the like will be explained. In the example, an identification system 5000 configured by an optical fiber 5001 as an optical fiber subjected to measurement and the optical fiber sensor 100 is used to specify a crack position. The hydraulic-fracturing method is a method of injecting extra-high pressure water into a rock body of the underground G to cause a crack CR in a hollow H in the reservoir layer RL. When generating the crack CR, a micro earthquake occurs, and its vibrational wave SW is transferred. To address this, aside from a well W2 at a point where the extra-high pressure water is injected, a well W1 is dug for investigation, and then, the optical fiber 5001 is laid in the well W1. The vibrational wave SW from the crack CR generated by hydraulic fracturing is transferred in the ground and reaches the optical fiber 5001 in the well W1. The acoustic wave generated in the optical fiber 5001 is measured by the optical fiber sensor 100 using the vibrational wave SW. The position of the crack generated in the stratum may be specified from a position, a propagation speed, and the like of a vibrational wave detected in the optical fiber 5001.

According to the present disclosure, an acoustic wave may be detected with an improved distance resolution.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber sensor comprising:
    a transmitter configured to output a first light and a second light into an optical fiber, wavelengths of the first light and the second light being different from each other at a specific time, and at least one of the wavelengths of the first light and the second light varying with time; and
    a device configured to receive back-scattered light output from the optical fiber and detect a temporal variation of an optical phase at an arbitrary interval in a longitudinal direction of the optical fiber by measuring an interference state of the first light and the second light.

2. The optical fiber sensor according to claim 1, wherein the transmitter includes:
    a light source configured to generate light whose wavelength varies periodically;
    a first split coupler configured to split the light output from the light source into a third light and a fourth light;
    a first frequency shifter configured to shift a frequency of the third light output from the first split coupler by a constant amount;
    a second split coupler configured to split the fourth light output from the first split coupler into a fifth light and a sixth light;
    a first delay optical fiber configured to propagate the fifth light output from the second split coupler;
    a first multiplexing coupler configured to multiplex the light output from the first frequency shifter with the light output from the first delay optical fiber and output the lights as the two lights; and
    a second frequency shifter configured to shift a frequency of the sixth light output from the second split coupler by a constant amount and generate reference light, and
the device includes:
    a first light-receiver configured to receive the reference light and the back-scattered light and generate an electric signal including a beat signal generated by the received reference light and the received back-scattered light; and
    a frequency analyzer configured to perform a frequency analysis to a desirable frequency domain of the electric signal.

3. The optical fiber sensor according to claim 2, wherein the device further includes:
    a splitter configured to split the electric signal into two signals;
    two band-pass filters configured to transmit the respective two electric signals output from the splitter, transmission frequency bands of the band-pass filters being different from each other;
    a mixer configured to multiplex one of the two electric signals transmitting through one of the band-pass filters with a sine wave signal;
    a delay track configured to propagate the electric signal; and
    a coupler configured to couple the electric signal propagating through the delay track and the other one of the two electric signals propagating through the other one of the band-pass filters and output the coupled electric signal to the frequency analyzer.

4. The optical fiber sensor according to claim 2, wherein the device further includes a polarization diversity optical element configured to split each of the back-scattered light and the reference light into two polarization components, multiplex the split back-scattered light and the split reference light for each polarization component, and output the multiplexed polarization components of the back-scattered light and the split reference light to the first light-receiver.

5. The optical fiber sensor according to claim 1, wherein the transmitter includes:
    a light source configured to generate light whose wavelength varies periodically;

a first split coupler configured to split the light output from the light source into a seventh light and an eighth light;
a first frequency shifter configured to shift a frequency of the seventh light output from the first split coupler by a constant amount;
a second split coupler configured to split the eighth light output from the first split coupler into a ninth light and a tenth light;
a first delay optical fiber configured to propagate the ninth light output from the second split coupler;
a first multiplexing coupler configured to multiplex the light output from the first frequency shifter with the light output from the first delay optical fiber and output the lights as the two lights; and
a second frequency shifter configured to shift a frequency of the tenth light output from the second split coupler by a constant amount and generate reference light, and the device includes:
a third split coupler configured to split the back-scattered light into two split back-scattered lights;
a third frequency shifter configured to shift a frequency of one of the two split back-scattered lights output from the third split coupler by a constant amount;
a second delay optical fiber configured to propagate the light output from the third frequency shifter;
a second multiplexing coupler configured to multiplex the other one of the split back-scattered lights output from the third split coupler with the light output from the second delay optical fiber;
a second light-receiver configured to receive the reference light and the back-scattered light and generate an electric signal including a beat signal generated by the received reference light and the received back-scattered light; and
a frequency analyzer configured to perform a frequency analysis to a desirable frequency domain of the electric signal.

6. The optical fiber sensor according to claim 2, wherein the light source includes:
a light source; and
a modulator configured to temporally modulate a frequency of the light output from the light source.

7. The optical fiber sensor according to claim 5, wherein the light source includes:
a light source; and
a modulator configured to temporally modulate a frequency of the light output from the light source.

8. The optical fiber sensor according to claim 2, wherein the light source includes:
a light source; and
a driver configured to supply a temporally modulated electric current to the light source for driving the light source.

9. The optical fiber sensor according to claim 5, wherein the light source includes:
a light source; and
a driver configured to supply a temporally modulated electric current to the light source for driving the light source.

10. The optical fiber sensor according to claim 1, wherein the transmitter includes:
a light source;
a first split coupler configured to split the light output from the light source into an eleventh light and a twelfth light;
a first modulator configured to periodically vary a wavelength of the eleventh light output from the first split coupler;
a first frequency shifter configured to shift a frequency of the twelfth light output from the first split coupler by a constant amount;
a second modulator configured to periodically vary a wavelength of light output from the first frequency shifter; and
a first multiplexing coupler configured to multiplex the lights output from the first and the second modulators and output the multiplexed lights as the two lights, and the device includes:
a third light-receiver configured to receive the back-scattered light and generate an electric signal;
a frequency-selecting filter configured to select a specific frequency component from the electric signal; and
a temporal-fluctuation-detecting device configured to detect a temporal fluctuation of the electric signal of the selected frequency component.

11. The optical fiber sensor according to claim 1, wherein the transmitter includes:
a light source;
a first split coupler configured to split the light output from the light source into a thirteenth light and a fourteenth light;
a first modulator configured to periodically vary a wavelength of the thirteenth light output from the first split coupler;
a first frequency shifter configured to shift a frequency of the fourteenth light output from the first split coupler by a constant amount; and
a first multiplexing coupler configured to multiplex the light output from the first modulator with the light output from the first frequency shifter and output the multiplexed light as the two lights, and the device includes:
a fourth light-receiver configured to receive the back-scattered light and generate an electric signal;
a frequency-selecting filter configured to select a specific frequency component from the electric signal; and
a temporal-fluctuation-detecting device configured to detect a temporal fluctuation of the electric signal of the selected frequency component.

12. The optical fiber sensor according to claim 10, wherein the device includes:
a second split coupler configured to split the back-scattered light into two split back-scattered lights;
a second delay optical fiber configured to propagate one of the split back-scattered lights output from the second split coupler;
a third frequency shifter configured to shift a frequency of the light output from the second delay optical fiber by a constant amount;
a third multiplexing coupler configured to multiplex other one of the split back-scattered lights output from the second split coupler with the light output from the third frequency shifter;
a fifth light-receiver configured to receive the light output from the third multiplexing coupler and generate an electric signal;
a frequency-selecting filter configured to select a specific frequency component from the electric signal; and a temporal-fluctuation-detecting device configured to detect a temporal fluctuation of the electric signal of the selected frequency component.

13. The optical fiber sensor according to claim 11, wherein the device includes:
a second split coupler configured to split the back-scattered light into two split back-scattered lights;
a second delay optical fiber configured to propagate one of the split back-scattered lights output from the second split coupler;
a third frequency shifter configured to shift a frequency of the light output from the second delay optical fiber by a constant amount;
a third multiplexing coupler configured to multiplex other one of the split back-scattered lights output from the second split coupler with the light output from the third frequency shifter;
a sixth light-receiver configured to receive the light output from the third multiplexing coupler and generate an electric signal;
a frequency-selecting filter configured to select a specific frequency component from the electric signal; and
a temporal-fluctuation-detecting device configured to detect a temporal fluctuation of the electric signal of the selected frequency component.

14. The optical fiber sensor according to claim 1, wherein the transmitter includes:
a light source; and
a modulator configured to generate light of a sideband wave of the light output from the light source and output the light of the sideband wave as the two lights by periodically varying a wavelength of the light of the sideband wave, and the device includes:
a seventh light-receiver configured to receive the back-scattered light and generate an electric signal;
a frequency-selecting filter configured to select a specific frequency component from the electric signal; and
a temporal-fluctuation-detecting device configured to detect a temporal fluctuation of the electric signal of the selected frequency component.

15. The optical fiber sensor according to claim 1, further comprising:
a supplementary interferometer split coupler configured to split a part of the two lights output from the transmitter; and
a supplementary interferometer into which the split lights are input, the supplementary interferometer being configured to output a timing-adjusting electric signal,
wherein the timing-adjusting electric signal is input to the transmitter or the device, and is used for adjustment of timing of a temporal variation of wavelengths of the two lights in the transmitter or timing of electric signal detection in the device.

16. The optical fiber sensor according to claim 1, wherein the transmitter includes:
a polarization maintaining optical fiber; and
a polarization maintaining optical component configured to maintain a polarization state of light propagating through the transmitter.

17. The optical fiber sensor according to claim 1, wherein a measurement distance is 10 km at maximum, and a distance resolution is equal to or less than 10 cm.

18. A seismic prospecting method comprising using the optical fiber sensor according to claim 1 as an acoustic wave sensor.

19. A method of measuring petroleum, petroleum in a natural gas well and a natural gas reservoir layer distribution, the method comprising using the optical fiber sensor according to claim 1 as an acoustic wave sensor.

20. A method of detecting strain of a pipe line, the method comprising using the optical fiber sensor according to claim 1 as an acoustic wave sensor.

21. A method of specifying a position of a fissure in a stratum generated when using a hydraulic-fracturing method, the method comprising using the optical fiber sensor according to claim 1 as an acoustic wave sensor.

* * * * *